(12) United States Patent
Rossi et al.

(10) Patent No.: US 11,305,625 B2
(45) Date of Patent: Apr. 19, 2022

(54) LATCH ASSEMBLIES AND RAIL ATTACHMENT FOR A PICKUP TRUCK TONNEAU COVER

(71) Applicant: WORKSPORT LTD., Vaughan (CA)

(72) Inventors: Steven Rossi, Vaughan (CA); Jonathan Loudon, Toronto (CA); Julian Richardson, Flesherton (CA); Eric Sosenko, South Lyon, MI (US)

(73) Assignee: WorkSport Ltd., Vaughan (CA)

( * ) Notice: Subject to any disclaimer, the term of this patent is extended or adjusted under 35 U.S.C. 154(b) by 0 days.

(21) Appl. No.: 17/485,276

(22) Filed: Sep. 24, 2021

(65) Prior Publication Data

US 2022/0009327 A1 Jan. 13, 2022

Related U.S. Application Data

(63) Continuation of application No. 17/598,025, filed as application No. PCT/US2020/024737 on Mar. 25, 2020.

(60) Provisional application No. 62/823,316, filed on Mar. 25, 2019.

(51) Int. Cl.
*B60J 7/14* (2006.01)
*B60J 7/16* (2006.01)

(52) U.S. Cl.
CPC .............. *B60J 7/141* (2013.01); *B60J 7/146* (2013.01); *B60J 7/1607* (2013.01)

(58) Field of Classification Search
CPC ..... B60J 7/14; B60J 7/141; B60J 7/145; B60J 7/146; B60J 7/1607

USPC ............. 296/100.01, 100.02, 100.06, 100.07
See application file for complete search history.

(56) References Cited

U.S. PATENT DOCUMENTS

| | | | |
|---|---|---|---|
| 5,207,470 A | 5/1993 | Rafi-Zadeh | |
| 6,257,647 B1 | 7/2001 | Ninness et al. | |
| 6,447,045 B1 | 9/2002 | Dickson et al. | |
| 6,688,668 B2 | 2/2004 | Stevens et al. | |
| 7,052,071 B2 * | 5/2006 | Mulder ................... | B60J 7/1621 296/100.06 |
| 7,252,322 B2 | 8/2007 | Rusu | |
| 7,735,881 B2 | 6/2010 | Steffens et al. | |
| 8,511,736 B2 * | 8/2013 | Williamson ............ | E05C 19/10 296/100.07 |
| 8,807,625 B2 | 8/2014 | Garska | |
| 9,487,071 B1 | 11/2016 | Yue | |
| 10,399,420 B2 | 9/2019 | Rossi | |
| 10,596,887 B2 | 3/2020 | Rossi et al. | |
| 2009/0274531 A1 | 5/2009 | Townson | |

(Continued)

*Primary Examiner* — Jason S Daniels
(74) *Attorney, Agent, or Firm* — Eric J. Sosenko; Jonathan P. O'Brien; Honigman LLP

(57) ABSTRACT

A tonneau system for use with a bed of a pickup truck. The tonneau system includes a tonneau cover and latch assemblies to retain the tonneau cover to the bed of the truck. The cover is moveable between an unfolded positon where the cover encloses the bed and a folded position where the bed is uncovered. The latch assemblies can include latch bases that define discreet mounting positons for a latch handle assembly that employ retention members to retain the latch handle assembly in a particular mounting positon. Another latch assembly includes a latch base having an endless belt to positon the latch handle assembly. A rail attachment is also provided to mount to the bed and provide an anchor point for keep in to tonneau cover engage over the bed.

19 Claims, 29 Drawing Sheets

(56) References Cited

U.S. PATENT DOCUMENTS

| | | |
|---|---|---|
| 2010/0038926 A1 | 2/2010 | Williamson et al. |
| 2012/0274091 A1 | 11/2012 | Yue |
| 2014/0117702 A1* | 5/2014 | Rossi .................... B60J 7/1858 296/100.14 |
| 2016/0096421 A1 | 4/2016 | Facchinello et al. |
| 2017/0144522 A1 | 5/2017 | Facchinello et al. |
| 2019/0061498 A1 | 2/2019 | DeLong |
| 2019/0105974 A1 | 4/2019 | Parkey |
| 2019/0126734 A1 | 5/2019 | Dylewski, II et al. |
| 2019/0291553 A1 | 9/2019 | Ma |
| 2020/0398651 A1* | 12/2020 | Allen .................... B60J 7/1607 |

* cited by examiner

LATCH ASSEMBLIES AND RAIL ATTACHMENT FOR A PICKUP TRUCK TONNEAU COVER

CROSS REFERENCE TO RELATED APPLICATION

This application is a continuation of U.S. application Ser. No. 17/598,025, filed Sep. 24, 2021, which is a national phase application of PCT/US2020/024737, filed Sep. 25, 2020, which claims priority to U.S. provisional application No. 62/823,316, filed Mar. 25, 2019, the entire contents of which is herein incorporated by reference.

TECHNICAL FIELD

The present invention generally relates to tonneau covers. More particular, the present invention relates to latch assemblies and rails of tonneau covers used in connection with pickup trucks, and still more particularly for covering the cargo box of such trucks.

BACKGROUND OF THE INVENTION

Tonneau covers are used to cover the cargo boxes or beds of pickup trucks (hereafter just "trucks") for aesthetics and to protect the contents in the bed, and the bed itself, from view, environmental factors, such as rain, dirt, snow and debris. Such systems also operate to retain the contents of the cargo box therein.

While various styles of tonneau covers exist, one of today's most popular styles is a foldable tonneau cover. A foldable tonneau cover is desirable in that when not required to cover the bed of the truck, the tonneau cover may be folded toward the rear of the cab of the truck, leaving at least a portion of the bed open and uncovered.

Foldable tonneau covers themselves come in soft fold tonneau covers and hard fold tonneau covers. Soft fold tonneau covers employ a foldable frame having typically three or more sections defined by side frame members and transverse frame members. Additional transverse members, sometimes referred to as cross bows, may be provided between the transverse frame members. A cover or tarp of a flexible material is retained over the entire foldable frame. The sections of the frame are connected by hinge systems that allow the sections to fold as noted above. When being folded, generally, the rearmost section of the tonneau cover is folded forwardly toward the cab and on top of the next rearmost section of the tonneau cover. These two sections are then folded forwardly together onto the next rear most section of the tonneau cover. This may then be continued until all sections of the tonneau cover are folded one on top of one another forming a stack of tonneau cover sections adjacent to the passenger cabin or cab of the truck. In this instance, the section of the tonneau cover located closest to the cab forms the bottom of the stack.

In a hard fold tonneau cover, typically include three or more rigid panel sections. The panel sections include upper and lower rigid skins between which a rigid core is provided. Opposing sides are defined by side frame members and front and rear ends of the panel sections are defined by transverse frame members. Cross bows may also be provided in the panel sections between the transverse frame members. The panel sections are interconnected by hinge systems that allow them to fold in the generally the same manner as the previously described soft fold tonneau covers. Accordingly, the panels sections can be folded forwardly, one a top another, until forming a stack adjacent to rear of the cab of the truck.

In order to retain the tonneau covers on the bed of the truck, the tonneau cover includes latches, typically, but not necessarily, located adjacent the four corners of the tonneau cover. One common type of latch is an over center cam lock latch that hooks onto a downwardly projecting flange of the sidewall of the bed of the truck. This latch utilizes a handle that cooperates with a cam surface to cause a clamp jaw to clamp onto the flange of the sidewall. Another common type of latch is what is often referred to as a screwdriver latch. With this type of latch, a handle, resembling a screwdriver handle, is threadably engaged with a shaft extending through the handle and rotation of the handle relative to the shaft causes a clamp jaw to clamp onto the flange of the sidewall.

Other styles of tonneau covers include roll-up tonneau covers and single section tonneau covers. With the former, the cover can be rolled up, starting adjacent to the tailgate, to open the bed of the truck. With a single section tonneau cover, the tonneau cover cannot fold and is typically pivotally mounted near the passenger cabin of the truck and can be lifted at the tailgate to allow for access into the bed of the truck. Single panel tonneau covers still employ lateral frame members and or cross bows and require a means to secure the tonneau cover to the bed of the truck.

Different trucks have different sized beds and different sized sidewalls that define their beds. Accordingly, to allow for a particular size of tonneau cover to be used with different trucks, while still being properly retained over the bed of the truck, the location at a latch extends from a section of the tonneau cover to may need to be different from installation to another. In other words, the position of attachment of the latch to the tonneau cover section, relative to side edge of the tonneau cover section, may need to different for different trucks.

While current latches allow for variability in the positioning of the latch relative to the tonneau cover section, such variability is often not stable or conveniently achieved, and often storage of the latch during folding of the tonneau cover is cumbersome or impractical requiring removal of the latch.

SUMMARY

In overcoming the enumerated drawbacks and other limitations of the related art, the present invention provides a tonneau system for use with a bed of a pickup truck.

Accordingly, in one aspect of the present invention, the tonneau system includes a tonneau cover having at least two tonneau sections, including a first tonneau section and a second tonneau section. The tonneau sections are moveable relative to one another between an unfolded state and a folded state. In the unfolded state the tonneau sections substantially cover the cargo box, and in the folded state the tonneau sections are arranged in a stack, with the tonneau sections being arranged one atop another. The tonneau system also includes latch assemblies having a latch base and a latch handle assembly. The latch handle assembly including a handle, a clamp jaw, an adjustment rod, and a pivot member. The handle and clamp jaw are supported on the adjustment rod with the handle being engaged with the clamp jaw and configured to move the clamp jaw relative to the adjustment rod. The adjustment rod is connected at one end to the pivot member. The latch base is supported by the tonneau cover and includes a body defining a plurality of discrete mounting positions. The body defines a longitudinal axis extending transversely across the tonneau cover, a lateral axis extending lengthwise of the tonneau cover and a normal axis extending perpendicularly to a plane generally defined by the tonneau cover in the unfolded position. The latch handle assembly is releasably retained with the latch base in one of the mounting positions, and each mounting positions includes an entrance passageway extending into the body of the latch base. The latch handle assembly is releasably retained in one of the mounting positions by a resilient retention member that is located in the passageway and deformable by the latch handle assembly during insertion and withdrawal of the latch handle assemble through the passageway. The resilient retention member engages the latch handle assembly and retains the latch handle assembly in the mounting positions.

In another aspect, the passageway is oriented substantially parallel to the lateral axis of the body of the latch base.

In another aspect, the passageway terminates in an arcuate end wall, the retention member being spaced apart from the end wall.

In another aspect, the retention member is spaced apart from end wall a distance less than an effective diameter of the pivot member.

In a further aspect, the retention member is a protuberance defining in the passageway.

In another aspect, the protuberance extends across the passageway.

In another aspect, the passageway corresponds in shape to the pivot member.

In an additional aspect, the pivot member is a cylindrical barrel defining a diameter.

In another aspect, the pivot barrel defines a slot and an end of the adjustment rod is engaged in the slot.

In another aspect, the pivot barrel has a longitudinal axis oriented along the transverse axis in the one of the mounting positions.

In another aspect, the pivot barrel is rotatable about the longitudinal axis in each of the plurality of the mounting positions.

In still another aspect, a slot is defined in the body of the latch base opposite of the passageway.

In a further aspect, the slot is oriented substantially parallel to the lateral axis of the body of the latch base.

In another aspect, the slot has a width corresponding to a diameter of the adjustment rod.

In yet another aspect, the latch handle assembly is moveable between use and stowed positions, in the stowed position the adjustment rod being located in the slot.

In another aspect, a protuberance is located in the slot and engaging the adjustment rod whereby the adjustment rod is removeable retained in the slot.

In another aspect, the protuberance extends along a length of the slot.

In an additional aspect, the passageway has a width corresponding to a length of the pivot member.

In another aspect, the pivot member is rotatable within the plurality of mounting positions.

In still a further aspect, the tonneau cover includes side frame members configured to extend along the sidewalls of the bed of the pickup truck and lateral frame members extending between the side frame members, the latch base including a mounting boss received in an end of one of the lateral frame members.

In another aspect, the latch base includes a mounting flange opposite of the mounting boss, the mounting flange being attached to one of the side frame members.

In another aspect, the adjustment rod includes an off-set shank

In another aspect, the latch handle assembly is moveable between use and stowed positions, in the stowed position the adjustment rod extending over latch base in a direction generally parallel with the transverse axis of the latch base.

In an additional aspect, the passageway defines an entrance opening oriented generally parallel to the normal axis.

In another aspect, the entrance passage way include channel extending along the longitudinal axis of the latch base.

In still another aspect, the channel terminates in a recess defined in the latch body.

In another aspect, the recess is defined in part by a bottom wall of the latch base, the bottom wall facing into the bed of the truck.

In yet another aspect, recess is defined in part by a top wall of the latch base.

In another aspect, the top wall is a formed at least in part by a web extending in the direction of the lateral axis of the latch body.

In further aspect, the channel is defined in part by a resilient tang.

In another aspect, the resilient tang includes a free end terminating a distanced spaced apart from a terminal end of the passageway.

In another aspect, the retention member is protuberance on the free end of the resilient tang.

In another aspect, protuberance is spaced apart from the terminal end of the passageway a distance generally corresponding to a width of the pivot member.

In still a further aspect, the pivot member defines a pivot axis oriented generally parallel to the lateral axis of the latch base.

In another aspect, the tonneau cover includes side frame members configured to extend along the sidewalls of the bed of the pickup truck and lateral frame members extending between the side frame members, the latch base being received an end of one of the lateral frame members.

In another aspect, the lateral member includes portions defining cutouts corresponding to the entrance openings.

In another aspect, the latch handle assembly is moveable between a use position and stowed positions, in the stowed position the adjustment rod extending generally along the longitudinal axis of the latch base.

In another aspect, the lateral frame member includes retainer located therein and configured to engage the handle of the latch handle assembly.

In another aspect, the retainer defines a width less than a width of the latch handle.

In another aspect, the retainer is resilient.

In another aspect of the invention, a tonneau system for use with a bed of a pickup truck is provided. The bed has opposing first and second sidewalls and also have a front sidewall extending between the first and second sidewalls at one end thereof, and a rear sidewall extending between the first and second sidewalls at another end thereof. The tonneau system includes a tonneau cover having at least two tonneau sections, including a first tonneau section and a second tonneau section. The tonneau sections are moveable relative to one another between an unfolded state and a folded state. In the unfolded state the tonneau sections substantially cover the cargo box. In the folded state the tonneau sections are arranged in a stack with the tonneau sections positioned one atop another. The tonneau cover also includes a plurality of latch assemblies, with each latch assembly including a latch base and a latch handle assembly. The latch handle assembly further including a handle, a clamp jaw, and an adjustment member. The handle and clamp jaw are supported on the adjustment member, with the handle being engaged with the clamp jaw and configured to move the clamp jaw relative to the adjustment member. The adjustment member is connected at one end to the latch base. The latch base includes a belt extending about end rollers and is moveable about the end rollers in a direction generally transvers to lateral side of the tonneau cover.

In another aspect, the belt is an endless belt.

In another aspect, the adjustment member is connected to the latch base by attachment of the one end to the belt.

In a further aspect, the adjustment member is connected to the latch base by attachment of the one end to the belt at an outer surface of the belt.

In another aspect, the belt includes a central split over at least a portion of the length of the belt.

In another aspect, the adjustment member is connected to the latch base by attachment of the one end to the belt at an inner surface of the belt.

In an additional aspect, the one end of the attachment member extends through the central split of the belt.

In another aspect, an extension projects of off an end of the adjustment member, the projection engages the belt in a use position of the latch assembly and during such engagement.

In another aspect, the projection engages an upper run of the belt.

In another aspect, the latch assembly is moveable between use and stowed positions, in the stowed position the clamp jaw of the being located in the split of the belt.

In an additional aspect, the latch assembly is moveable between use and stowed positions, in the stowed position the clamp jaw extending about the belt and one end roller of the latch base.

In another aspect, a lock assembly is moveable between a position engaged with the belt and a position disengaged with the belt, in the engaged position the lock assembly inhibits rotation of the belt.

In another aspect, the lock assembly is a cam lock, the cam lock have a cam surface moveable between the engaged position and the disengaged position.

In still a further aspect, the cam lock includes a lever handle coupled to the cam surface and configured to move the cam surface between the engage and disengaged position.

In another aspect, the cam lock further includes a biasing member coupled to the cam surface and biasing the cam surface into the engaged position.

In yet another aspect, the adjustment member is connected to the latch base by attachment of the one end to the belt at an inner surface of the belt.

In another aspect, the belt is freely moveable about the rollers and tension on the belt during engagement of the latch assembly with the sidewall of the bed cause self-centering of the latch handle assembly and latch base relative to the sidewall of the bed of the truck.

In a further aspect, the tonneau cover is a soft fold tonneau cover.

In still another aspect the tonneau cover is a hard fold tonneau cover.

In one additional aspect of the invention, a rail attachment for use with a bed of a pickup truck, wherein the bed has opposing first and second side walls and also has a front sidewall extending between the first and second sidewalls at one end thereof and a rear sidewall extending between the first and second bed at an opposed end thereof. Upper portions of the first and second side walls define bed rails of the bed. The rail attachment includes a base plate having an upper lip projecting laterally outward from a base wall of the base plate. The base wall including portions defining a clamp opening. A catch plate is mounted to the base plate at least partially over the clamp opening. The catch plate includes a catch extending through the clamp opening and a vertical clamping space is defined between the upper lip and the catch and is configured to receive a portion of the bed rail therein. A clamp plate mounted to the base plate. The clamp plate cooperates with the base wall to define a lateral clamping space between clamp plate and the base wall and is configured to receive a portion of the bed rail therein. The lateral clamping space is oriented perpendicular to the vertical clamping space. An anchor point is mounted to the base plate and the anchor point includes a catch extending from the base wall in a direction opposite from upper lip.

In another aspect, the catch is configured to engage a latch of a tonneau cover for mounting of the tonneau cover to the bed of the truck.

In another aspect, the catch plate is adjustably mounted to the base wall on a first side thereof.

In a further aspect, catch plate includes portions defining slots extending through the catch plate.

In another aspect, the threaded fasteners extend through the slots and engage threaded bores defined in the base wall, the catch plate being adjustable along a length of the slots.

In still another aspect, the clamp plate adjustably mounted to the base wall on a second side thereof.

In another aspect, the clamp plate adjustably mounted to the base wall on a side thereof.

In yet another aspect, the base wall includes portions defining slots extending through the base wall, threaded fasteners extending through the slots in the base wall and through bores defined in clamp plate, the clamp plate being adjustable along the slots in the base wall.

In another aspect, the slots are provided in an embossment formed in the base wall.

In an additional aspect, the base wall includes an upturned lip extending from a lower portion of the base wall and to a same side of the base wall as the upper lip, the upturned lip receiving a downturned lip provided on the clamp plate and supporting the clamp plate therein.

In another aspect, the anchor point is adjustably mounted to the base wall on a first side thereof.

In another aspect, the anchor point includes portions defining slots extending through the anchor point, and threaded fasteners extend through the slots in the anchor point and through bores defined in base wall, with the anchor point being adjustable along the slots.

In a further aspect, a tapered shim is provided between the anchor point and the base wall, the anchor point being adjustable through positioning of the shim.

In another aspect, the shim includes portions defining slots extending through the shim, the threaded fasteners extending through the slots in the shim.

In another aspect, the catch plate is mounted at a first height relative to the base wall and the clamp plate is mounted at a second height relative to the base wall, the first height being close to the upper lip than the second height.

In additional aspect, the catch plate is mounted at a first height relative to the base wall and the anchor point is mounted at a second height relative to the base wall, the second height being close to the upper lip than the first height.

In another aspect, the catch plate is mounted at a first height relative to the base wall, the clamp plate is mounted at a second height relative to the base wall, and the anchor point is mounted at a third height relative to the base wall, the third height being close to the upper lip than the first height and the first height being close to the upper lip than the second height.

In another aspect, a hook or loop is provided on the base wall and configured for attachment of an accessory thereto.

Further objects, features and advantages of this invention will become readily apparent to persons skilled in the art after a review of the following description, including the claims, and with reference to the drawings that are appended to and form a part of this specification. It will be appreciated that the foregoing summary sets out representative aspects of a tonneau system to assist skilled readers in understanding the following detailed description.

DETAILED DESCRIPTION

As used in the description that follows, directional terms such as "upper" and "lower" are used with reference to the orientation of the elements as presented in the figures. Accordingly, "upper" indicates a direction toward the top of the figure and "lower" indicates a direction toward the bottom of the figure. The terms "left" and "right" are similarly interpreted. The terms "inward" or "inner" and "outward" or "outer" indicate a direction that is generally toward or away from a central axis of the referred to part whether or not such an axis is designated in the figures. An axial surface is therefore one that faces in the axial direction. In other words, an axial surface faces in a direction along the central axis. A radial surface therefore faces radially, generally away from or toward the central axis. It will be understood, however, that in actual implementation, the directional references used herein may not necessarily correspond with the installation and orientation of the corresponding components or device.

Figure 1:
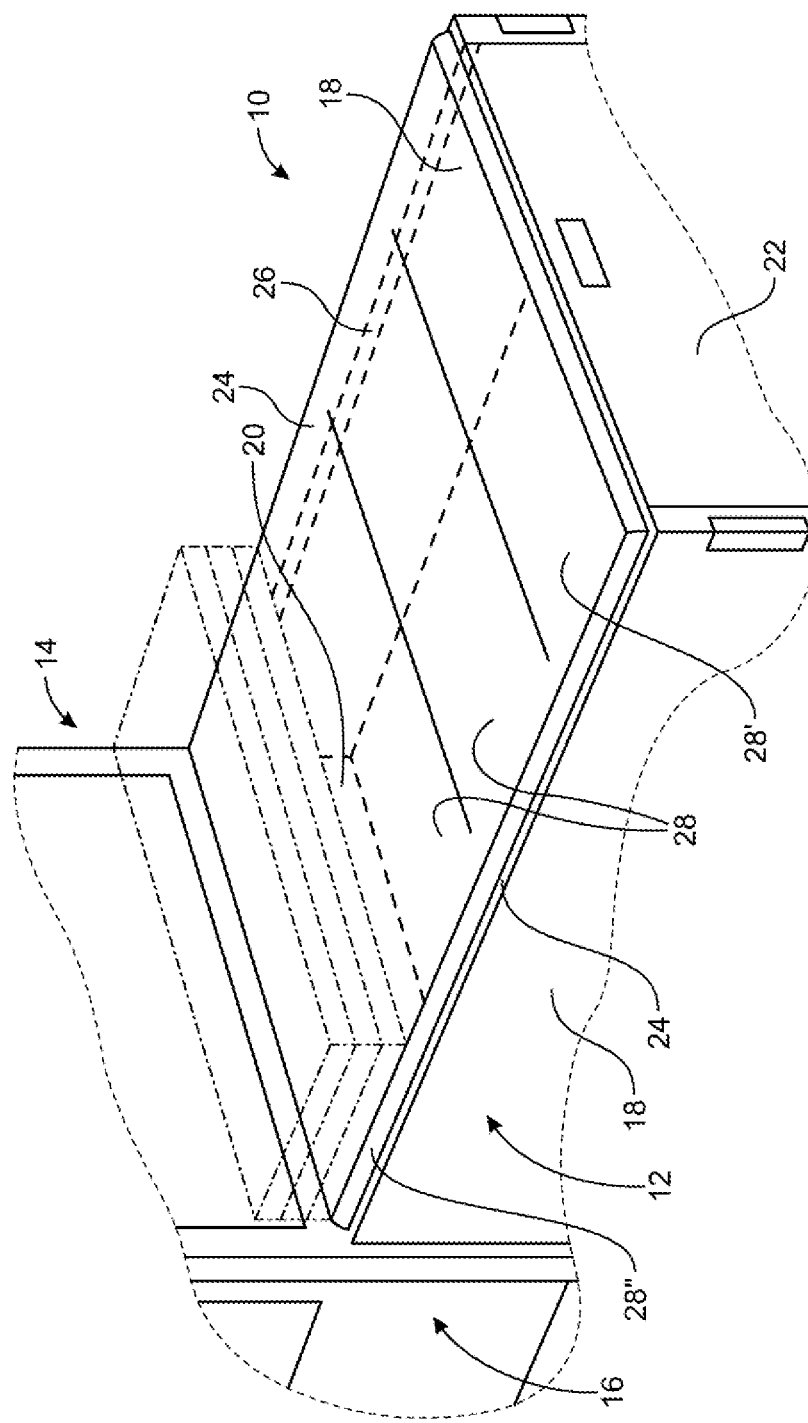
FIG. 1 is partial perspective view of a pickup truck having a tonneau cover according to the principles of the present invention extended over and covering the bed of the pickup truck.

Referring now to the drawings, a tonneau cover embodying the principles of the present invention is generally illustrated in FIG. 1 and designated at 10. The tonneau cover 10 is shown as being mounted to the cargo box or bed (hereafter "bed") 12 of a pickup truck (hereafter "truck") 14 so as to cover or enclose the bed 12. The bed 12 is located rearward of the passenger cabin or cab (hereafter "cab") 16 and includes a pair of opposed sidewalls 18 joined at their forward and reward ends by a front wall or bulkhead 20 and rear wall or tailgate 22, respectively. The tops of the sidewalls are typically reinforced and define bed rails 24 that include, on their laterally inward sides, a downwardly projecting flange 26.

As previously mentioned, tonneau covers themselves come in single section tonneau covers, soft fold tonneau covers and hard fold tonneau covers. Each of these tonneau covers include one or more sections having lateral frame members or crossbows. The latch and rail constructions described herein are equally useable with and applicable to single section tonneau covers, soft fold tonneau covers and hard fold tonneau covers. Accordingly, as described below, a reference to tonneau cover 10 is generic to any of these types of tonneau cover, unless the language of the description specifically requires a different interpretation or the description otherwise indicates to the contrary.

As seen in FIG. 1, the tonneau cover 10 is mounted to the bed 12 of a truck 14 and may include one or more sections. As specifically illustrated therein, the tonneau cover 10 is a soft fold tonneau cover having four tonneau sections, designated as tonneau sections 28, with section 28' being located closest or adjacent to the tailgate 22 and section 28" being located closest or adjacent to the bulkhead 20. The tonneau cover 10 includes a framework 32 (not seen in FIG. 1) of side frame members 34 and lateral frame members 36, the latter of which may include cross bows. The side frame members 34 rest on top of the bed rails 24 and the lateral frame members extend between the side frame members on opposite sides of the bed 12. A cover of flexible material, such as polyester backed vinyl, extends over and is retained with the framework 32.

The tonneau cover 10 of FIG. 1 is illustrated in its unfolded position where the tonneau cover 10 is fully extended and covers the bed 12 of the truck 14. A folded position of the tonneau cover 10 is also illustrated in FIG. 1. This is representatively shown with dash-dot lines with the tonneau sections 28 forming a stack 30 and the tonneau sections 28 being located one a top another.

In folding the tonneau cover 10 from its extended, unfolded position to its folded position, the section 28' adjacent to the tailgate 22 is first folded on top of the immediately adjacent intermediate section 28. Next these two sections 28 are folded on top of the next intermediate section 28. Finally, all three of these sections are folded on top of the section 28" adjacent to the bulkhead 20 or cab 16. In the stack 30 of tonneau sections 28, the tonneau sections 28" forms the bottom of the stack 30. As will be readily appreciated, the tonneau cover 10 of FIG. 1 may have included less than four sections 28 or more than four sections 28.

As previously noted, the following description of latches and rails is not limited to one specific type of tonneau cover 10.

Side Load Latch

Figure 2:
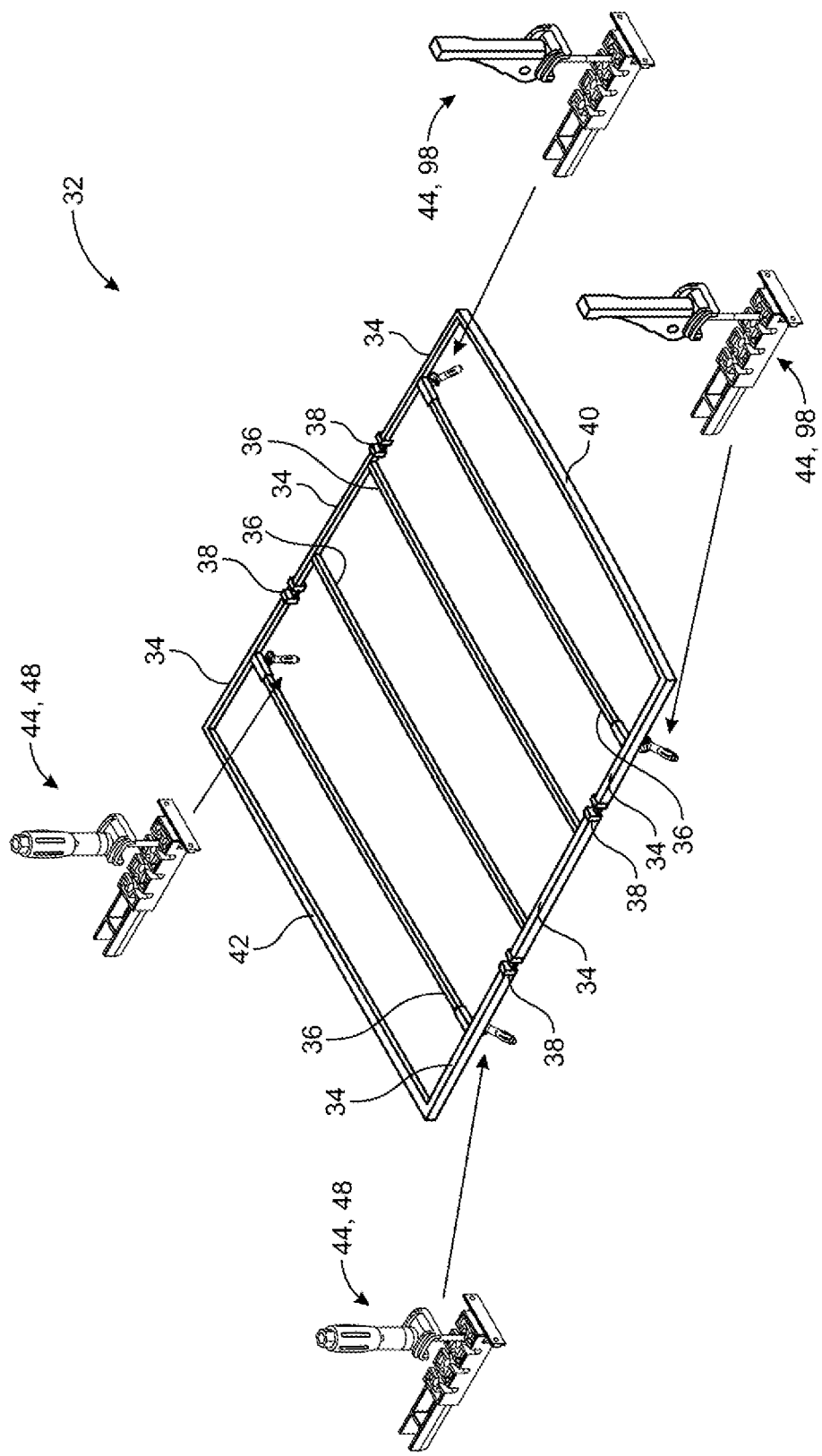
FIG. 2 is a perspective view of framework and latch assemblies for the tonneau cover.

Referring now to FIG. 2, a representative framework 32 of the tonneau cover 10 is illustrated therein, but in a three tonneau section 28 embodiment instead of the four tonneau section 28 embodiment of FIG. 1. The side frame members 34 and lateral frame members 36 are readily seen in FIG. 2. Along each side of the framework 32, three side frame members 34 are separated by hinges 38 that provide for the folding of the tonneau cover 10. A tailgate end lateral member 40 extends between the side frame members 34 closest to the tailgate 22 and a bulkhead end lateral member 42 extends between the side frame members 34 closest to the bulkhead 20 (when the tonneau cover 10 is mounted to the bed 12).

As will be readily appreciated by persons skilled in the technology of tonneau covers, not shown in FIG. 2 is the flexible cover that would be used with the framework 32 in a tonneau cover 10 of the soft fold variety or the rigid skins and cores that would be used with the framework 32 in a tonneau cover of the hard fold variety. A representative construction of a hard fold tonneau cover is disclosed in U.S. Pat. No. 10,596,887 and a representative construction of a soft fold tonneau cover is disclosed in U.S. Pat. No. 10,399,420, both of which are herein incorporated by reference in their entirety.

Also seen in FIG. 2 are latch assemblies 44 used to secure the tonneau cover 10 to the bed 12 of the truck 14. Four latch assemblies are seen in FIG. 2, two located near the bulkhead end of the tonneau cover 10 and two near the tailgate end of the tonneau cover 10. In the illustrated framework 32, the latch assemblies 44 are integrated with lateral frame members 36 at the ends thereof to join the lateral frame members 36 with the side frame members 34, as seen in FIG. 4.

Figure 10B:
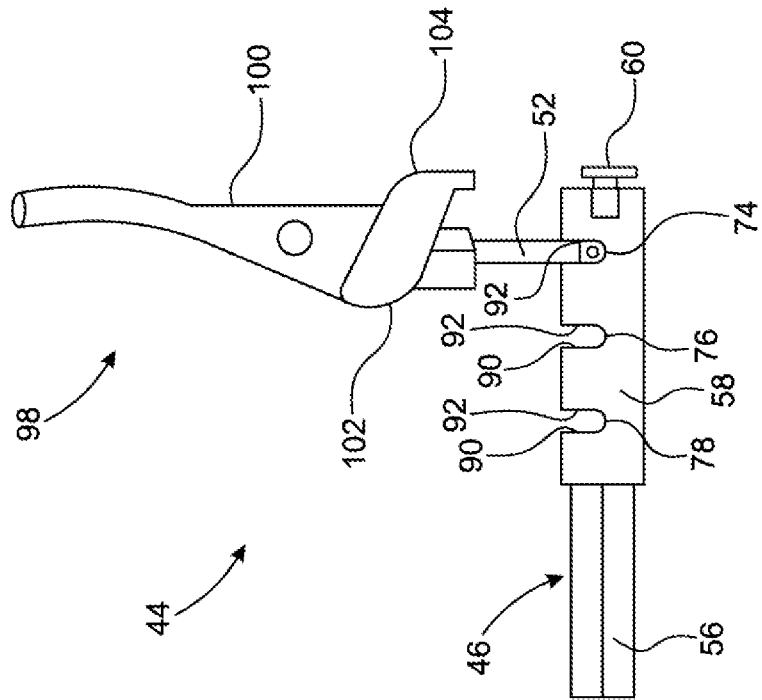
FIGS. 10A and 10B are side view of two different latch handle varieties for the latch assembly.
Figure 10A:
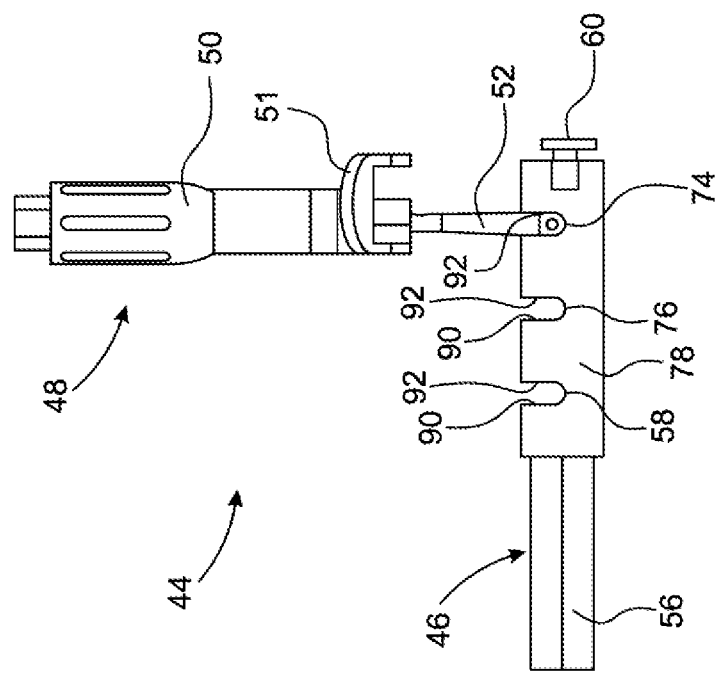

Two varieties of the latch assemblies 44 are used with the tonneau cover 10, but a single variety may be employed if desired. Since the tonneau section 28' needs to be released to provide access into the bed 12, latch assemblies 44 having quick releasing latch handle assemblies are used therewith. These latch handle assemblies 44 may be of an over center, locking cam handle variety, as seen in FIG. 10B, and which are well known in the industry and therefore not described in detail herein other than as needed to understand the present inventive concepts. The tonneau section 28" adjacent the bulkhead end of the tonneau cover 10 typically remains attached to the bed 12 of the truck 14, unless the tonneau cover 10 is being completely removed. Accordingly, a rotary latch handle assembly 44, which is not as readily released, may be used with the tonneau section 28". One type of rotary latch handle assembly 44 includes a knob threadably received on a shaft. As an alternative to the knob, screwdriver-like handle may be threadably received on the shaft. The screwdriver-like handle variety is illustrated in various figures, including FIG. 10A.

Figure 3:
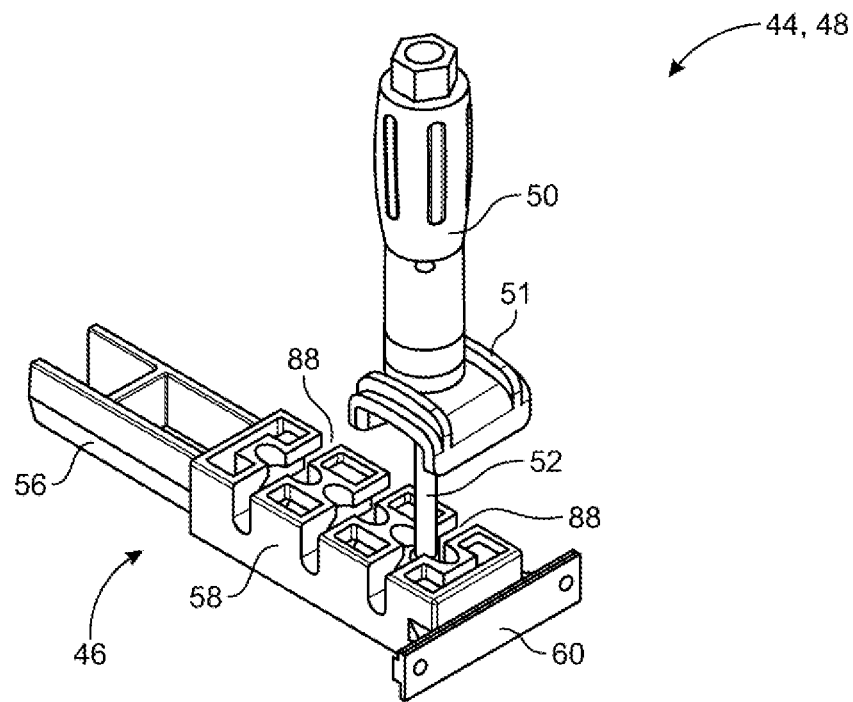
FIG. 3 is an inverted perspective view of one embodiment of a latch assembly seen in FIG. 2.
Figure 4:
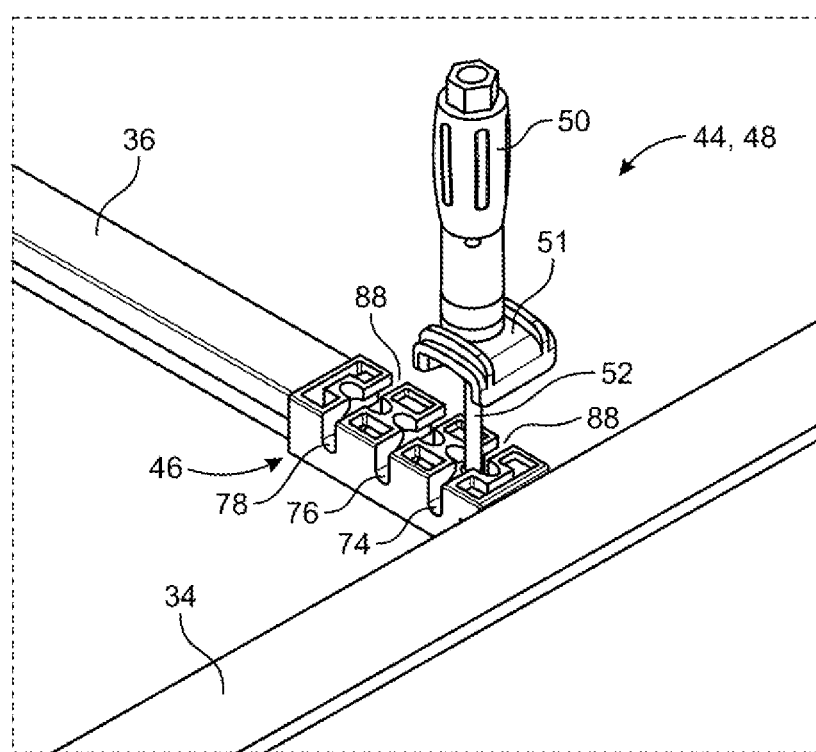
FIG. 4 is an inverted perspective view illustrating the latch assembly of FIG. 3 in conjunction with the framework of the tonneau cover.
Figure 5:
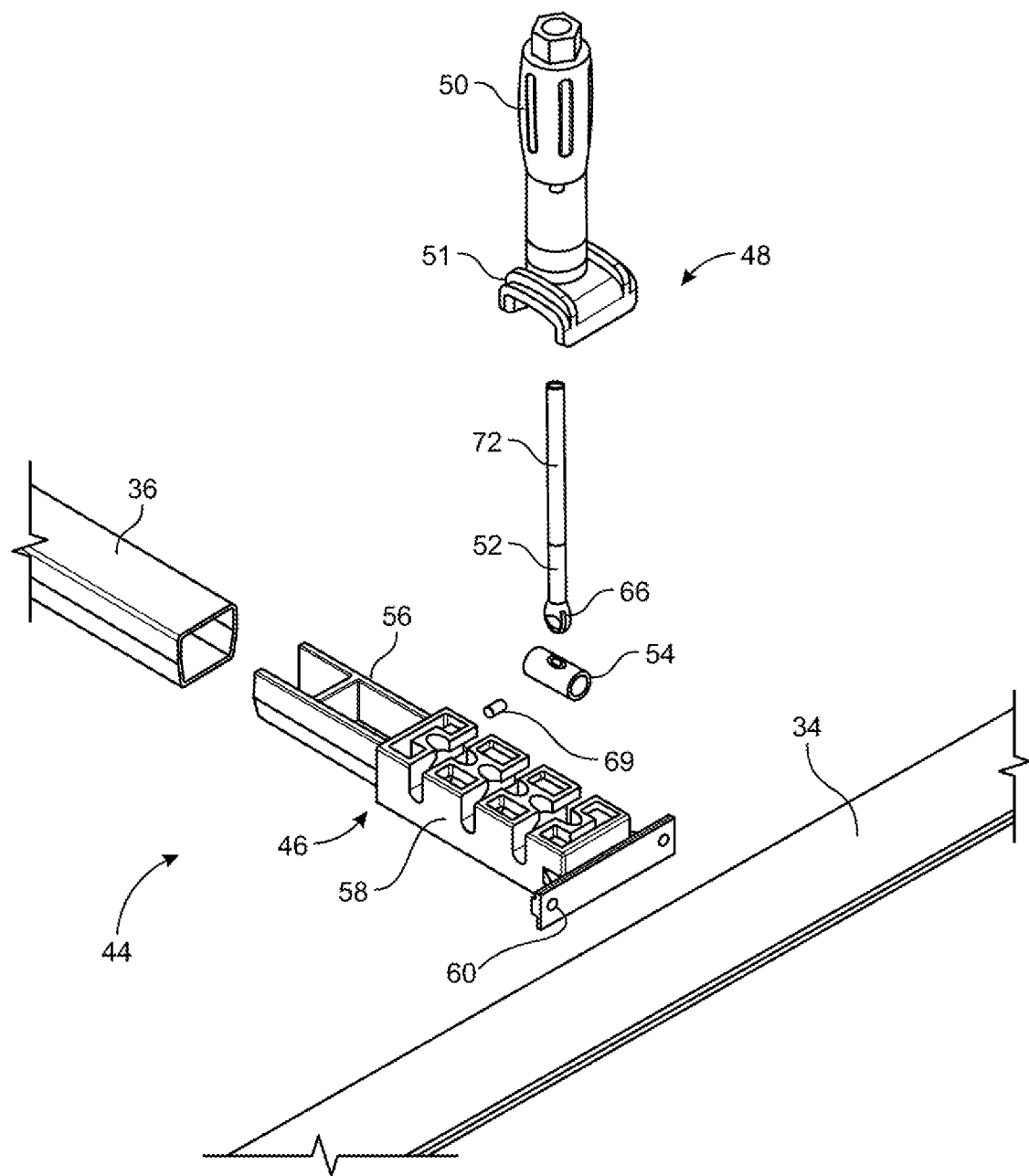
FIG. 5 is an inverted exploded view of the latch assembly and framework.
Figure 6C:
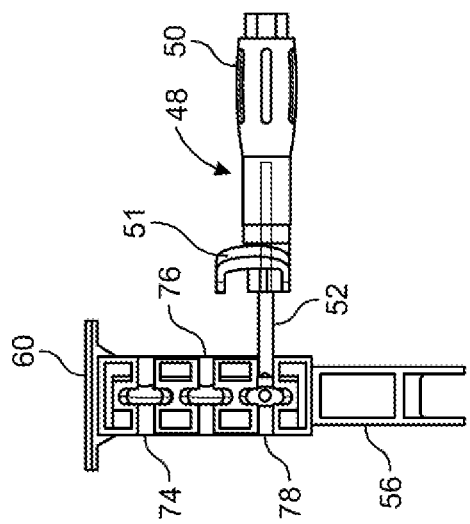
FIGS. 6A-6C are plan views of the latch assembly in three different mounted positions on the latch base for use with different sized bed rails of different trucks.
Figure 6B:
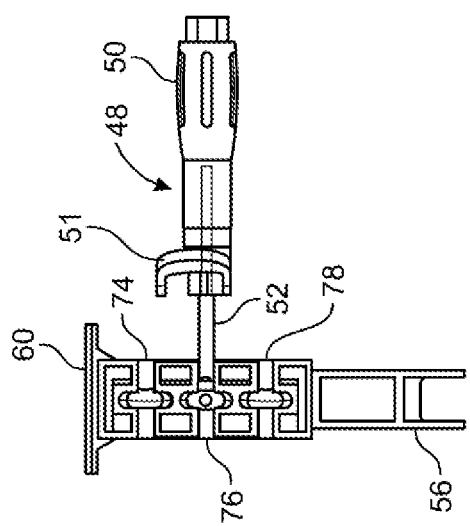
Figure 6A:
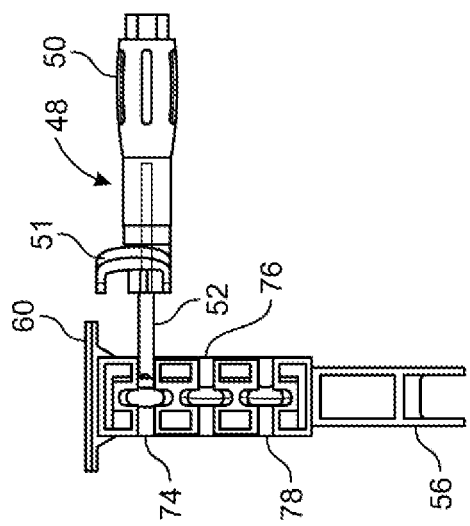

Referring now to FIGS. 3, 4 and 5, a latch assembly 44 having the rotary handle assembly mentioned above is seen therein. In the latch assembly 44 includes a latch base 46, and a rotary handle assembly 48. The rotary latch handle assembly 48 is further comprised of a screwdriver-type latch handle 50, a clamp jaw 51, a threaded adjustment rod 52 and pivot barrel 54.

The latch base 46 includes a mounting boss 56 extending from one end, seen in FIG. 3, and which is configured to be received within the end of a lateral frame member 36, as seen in FIG. 4. The mounting boss 56 may be press fit or otherwise provided into the end of the lateral frame member 36. The latch base 46 also includes a three positon mounting block 58 that allows the latch handle assembly 48 to be engaged therewith in three distinct positions. The mounting block 58 also includes, opposite of the mounting boss 56, a mounting flange 60 for use in securing the latch base 46, and the lateral frame member 36, to the side frame member 34. For this purpose, the lateral frame member 36 may be provided with apertures 62 and secured to the side frame member 34 by mechanical fasteners (not shown), such as screws or rivets. Alternatively, the mounting flange 60 may be formed as T-fitting and received within a slot defined in the side frame member 34.

Figure 11C:
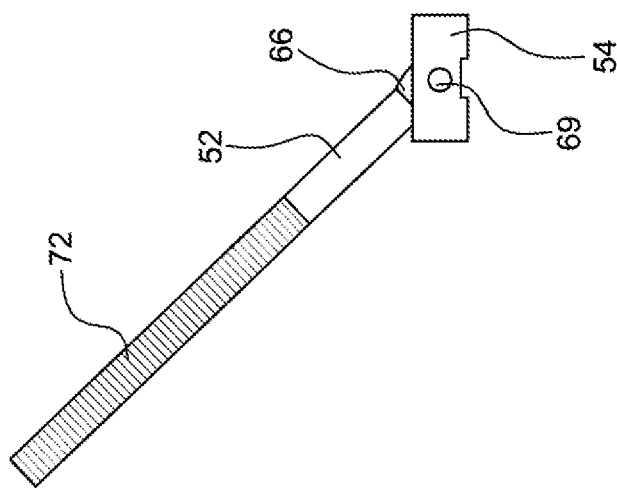
FIGS. 11A-11C are illustrations of the barrel and shaft in perspective, exploded and side views.
Figure 11B:
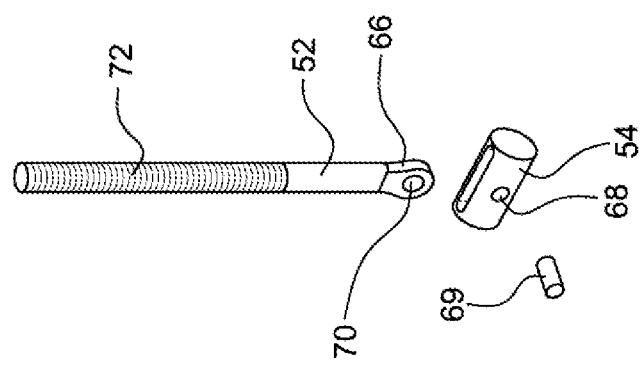
Figure 11A:
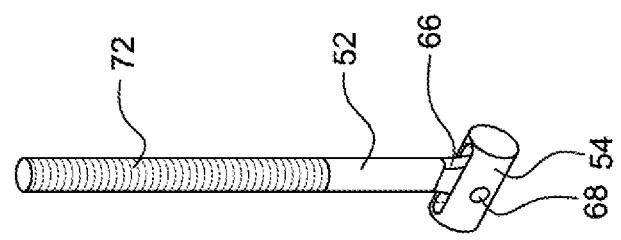

As best seen in FIGS. 7 and 11A-11C, the pivot barrel 54 is a cylindrical body having a slot 64 formed and oriented longitudinally within the body. The slot 64 is configured to receive a blade shaped tip 66 of the adjustment rod 52. Transverse to the slot 64, a bore 68 is provided in the pivot barrel 54 and a pin 69 is received therein. The pin 69 extends in the bore 68 and through a corresponding bore 70 in the tip 66 of the adjustment rod 52 to secure the pivot barrel 54 to the adjustment rod 52. The pin 69 may be press fit or otherwise secured in the bore 68. The slot 64 has a length greater than the width of the tip 66 and the bore 70 is slightly oversized relative to the pin 69. As a result and as seen in FIG. 11C, the adjustment rod 52 can pivot relative to the pivot barrel 54 and about the pin 69 in a direction corresponding the longitudinal axis of the pivot barrel 54. Preferably, the adjustment rod 52 can pivot about 35 degrees in either direction.

The clamp jaw 51 includes a bore through which the shank of the adjustment rod is inserted and the latch handle 50 is threadably engaged with a threaded portion 72 formed on the adjustment rod. The latch handle 50 thereby retains the clamp jaw on the adjustment rod 52. By rotating and advancing or retracting the latch handle 50 along the adjustment rod 52 relative to the latch base 46, the clamp jaw 51 can be brought into engagement with the flange 26 of the bed rail 24 or disengaged therefrom. As a result, the side frame member 34 may be clamped down onto the top of the bed rail 24, securely retaining the tonneau cover 10 in place.

Depending on the width of the bed rail 24, the position of the latch handle assembly 48 on the latch base 46 in relation to the side frame member 34 may need to be adjusted for proper positioning of the tonneau cover 10. As seen in FIG. 4, the latch handle assembly 48 is located in a narrow or first position, generally designated at 74, immediately adjacent to the side frame member 34. As seen in FIGS. 4, 6A-6C, 10A and 10B, two additional positions are defined in the latch base 46. These include a wide or second position 78 and an intermediate or third position 76, the latter being located between the narrow and wide positions 74, 78.

Figure 7:
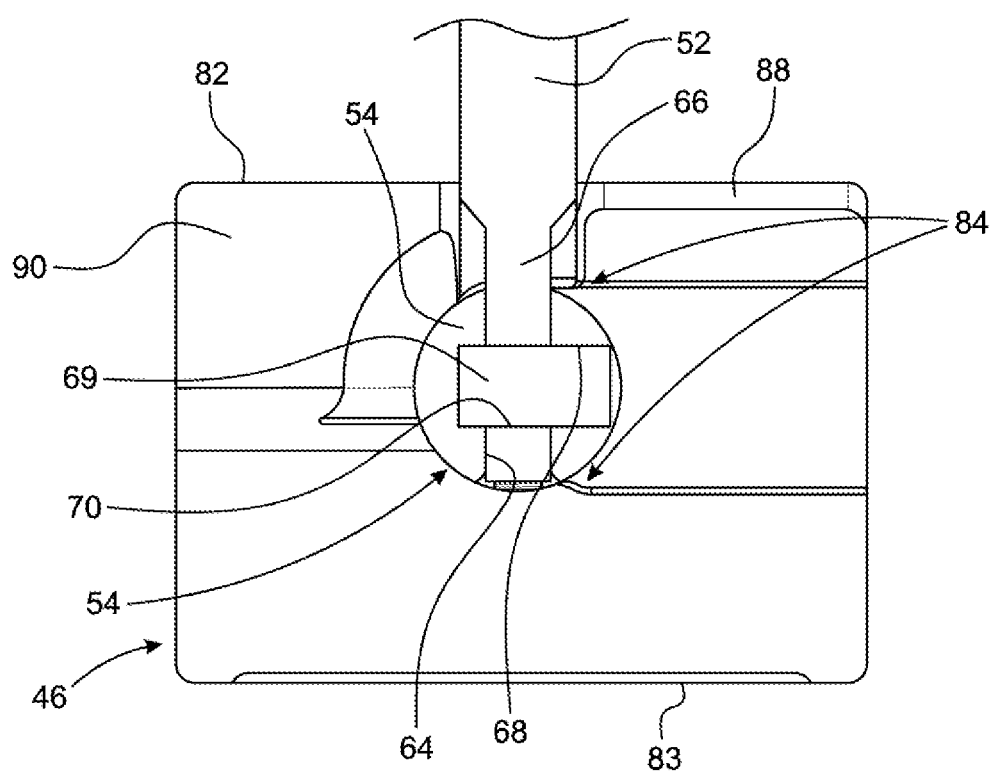
FIG. 7 is an enlarged cross-sectional view of the latch base showing the pivot barrel retained in one of the three mounting positions defined by the latch base of the latch assembly.
Figure 8:
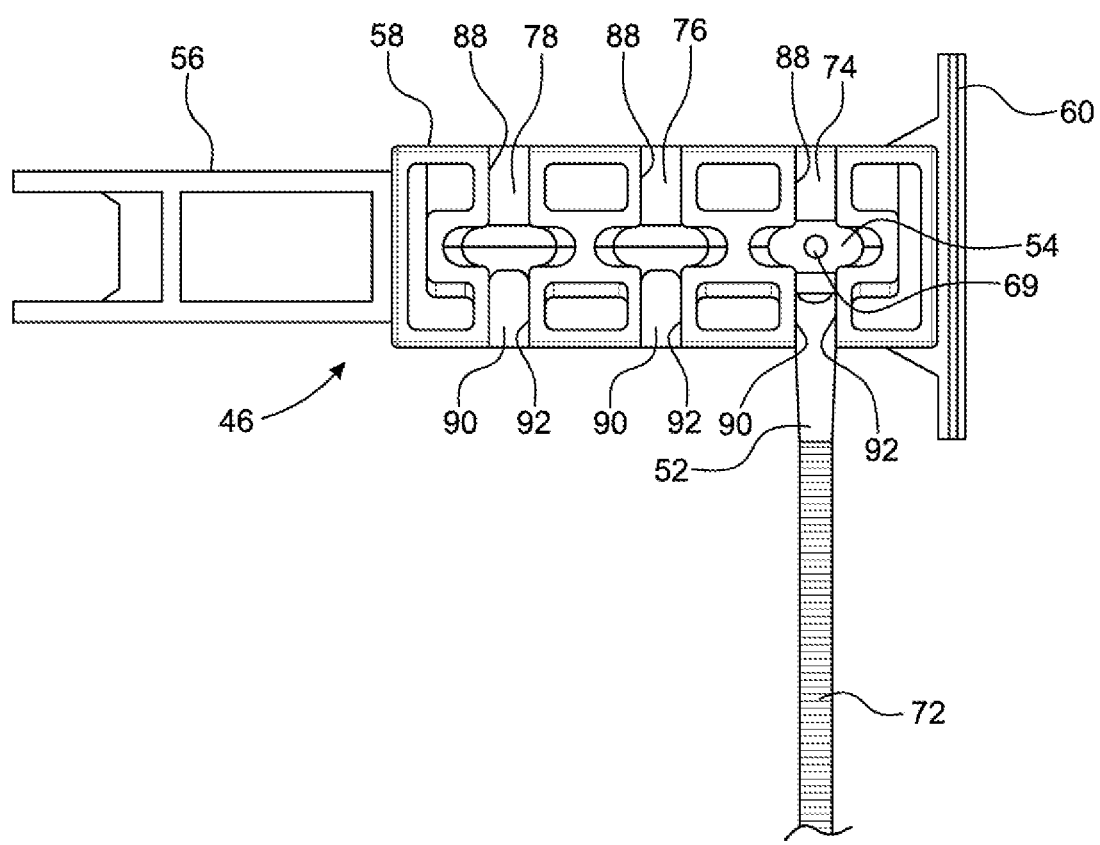
FIG. 8 is a view similar to FIGS. 6A-6C showing the latch assembly in a stored position.

Referring now to FIG. 7, an enlarged cross-sectional view of the engagement of the pivot barrel 54, and therefore the latch handle assembly 48, in the latch base 46 is shown. The engagement seen in FIG. 7 is representative of the engagement occurring at each of the three mounting positions 74, 76, 78 of the latch base 46. In the figure, the engagement is shown in an inverted orientation, contrary to its installation position. This is inverted position is shown to remain consistent with presentation of FIGS. 3 and 4, as well as other figures.

Each mounting position 74, 76, 78 is defined by a lateral slot 80 partway formed through the latch base 46 approximately midway between the bottom and top surfaces 82, 83 of the latch base 46. The lateral slot 80 has a height approximating the diameter of the pivot barrel 54 and a length, which is in a direction into the page of FIG. 7, approximating the length of the pivot barrel 54. The laterally inward end 84 of the lateral slot 80 is arcuate and approximates the radius of curvature defined by the cylindrical surface of the pivot barrel 54. To retain the pivot barrel 54 in the lateral slot 80, at least one of an upper and lower surface of the slot 80 is provided with a raised protrusion, boss or bump 86 that reduced the height of the lateral slot 80 to a dimension that is less than the diameter of the pivot barrel 54. Upon insertion of the pivot barrel 54 of the latch handle assembly 48 into the lateral slot 80, the pivot barrel 54 will progress until encountering the protrusion(s) 86. The material of the latch base 46 is sufficiently resilient that the pivot barrel 54 can be pushed over the protrusions(s) 86 and thereafter retained between the protrusions 86 and the inward end 84 of the lateral slot 80. Conversely, by pulling on the latch handle assembly 48, the pivot barrel 54 can be pulled over the protrusion(s) 86 and out of the lateral slot 80 of one mounting position 74, 76, 78 and then inserted into the lateral slot 80 of another mounting position 74, 76, 78. Non-limiting examples of materials for the latch base 46 is a plastic material or glass reinforced nylon or a similar material.

Extending downward from the lateral slot 80 to the bottom surface 82 is a entrance slot 88 of a reduced width that approximates the diameter of the adjustment rod 52. This entrance slot 88, which is readily seen in FIG. 3, allows for the latch handle assembly 48, including the pivot barrel 54, to be rotated while in the inward end of the lateral slot 80 so that the latch handle assembly 48 is generally perpendicular to the side frame member 34 and in a position for attaching the tonneau cover to the bed 12 of the truck 14. This position is the use position of the latch handle assembly 48.

When the tonneau cover 10 is to be folded into the stack 30, the latch handle assembly 48 must be moved from the use position so as to not interfere with folding of the tonneau cover 10. For this purpose, the latch handle assembly 48 may be rotated back through the entrance slot 88 into a position where the adjustment rod 54 extends out through the lateral slot 80. In this position, the latch handle assembly 48 is retained by the protrusion(s) 86.

Alternately, and preferably, the latch base 46 is provided with an additional slot 90 specifically defining a stowed position for the latch handle assembly 48. As seen in FIG. 7, opposite of the lateral slot 80 and the entrance slot 88, the latch base is formed with a stowage slot 90 that extends laterally out of the side of the latch base 46 and downward to the bottom surface 82. This stowage slot 90 has a diameter approximating the diameter of the adjustment rod 52. Provided in a side wall of the stowage slot 90, and seen in FIGS. 10A and 10B, a protrusion, boss or bump 92 extending into the slot 90. The protrusion 92 may also extend the lateral length of the stowage slot 90. In a manner similar to the protrusion 86 retaining the pivot barrel 54 in the lateral slot 80, the protrusion 92 in the stowage slot 90 is provided at a location in the slot 90 whereby the shank of the adjustment rod 52 can resiliently deform the protrusion allowing the adjustment rod 52 to move beyond the protrusion 92 and snap into the stowed position. This occurs as the latch handle assembly 48, including the pivot barrel 54, is rotated about the longitudinal axis of the pivot barrel 54. With the latch handle assembly 48 in the stowed position, the tonneau cover 10 may be folded as described above without interference by the latch handle assembly 48.

Figure 9:
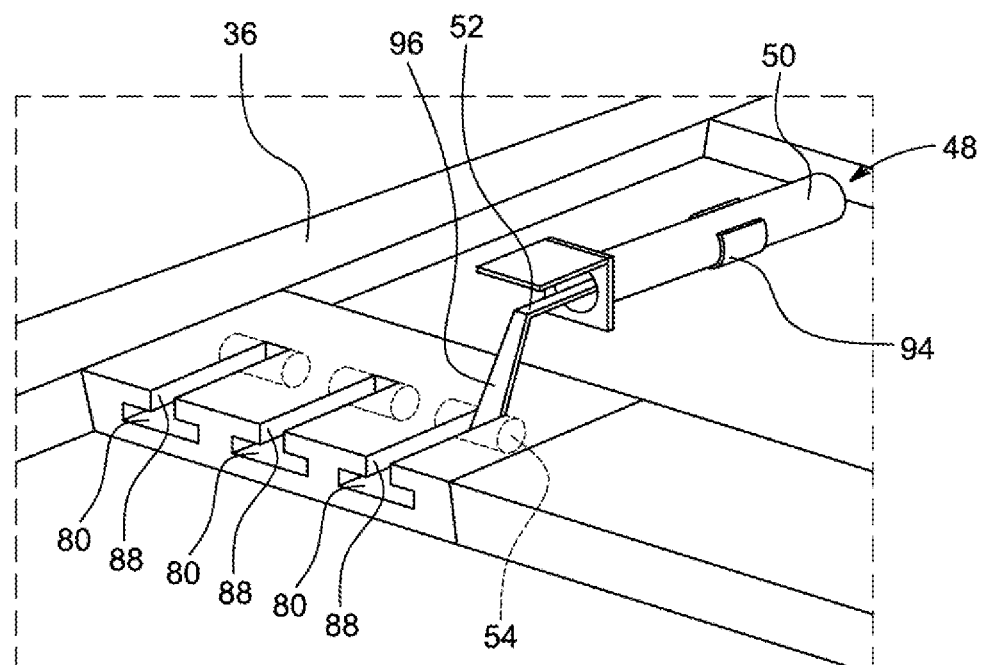
FIG. 9 is a perspective view of a variation of the latch assembly shown in the stored position.

As representatively shown in FIG. 9, the tonneau cover 10 may also be provided with a c-shaped clip 94 to engage the latch handle 50 in the stowed position. The C-shaped clip may be utilized with the previously discussed embodiment or may be used in an embodiment where the latch base 46 does not include a stowage slot 90 and, instead, employs an offset shank 96 in the adjustment rod 52 obviating the need for the stowage slot 90.

As so far discussed, the latch assembly 44 has been described as a rotational latch handle assembly 48. As previously mentioned, a cam latch assembly 98 may also be employed, particularly in connection with the tonneau section 28' adjacent to the tailgate 22. A cam latch handle assembly 98 is seen in FIGS. 2 and 10B and utilizes the same latch base 46, adjustment rod 52 and pivot barrel 54 discussed above. Instead of the screwdriver-like latch handle 50, the cam latch handle assembly 98 includes a lever handle 100 having a cam surface 102 that engages a clamp jaw 104 and forces the clamp jaw 104 into retaining engagement with the flange 26 as the lever handle 100 is pivoted upward toward the tonneau section of the tonneau cover, which is counterclockwise from the position seen in FIG. 10B. Like the screwdriver-like latch handle 50, the lever handle 100 is threadably received on the threaded portion 72 of the adjustment rod 52. Unlike the screwdriver-like latch handle 50, rotation of the lever handle 100 about the adjustment rod 52 to advance the lever handle 100 toward the latch base 46 is done only to initially position the clamp jaw 104 relative to the flange 26. Final engagement of the clamp jaw 104 with the flange 26 is achieved by pivoting the lever handle 100 toward the tonneau section 28' as mentioned above. In pivoting the lever handle 100, the cam surface 102 interacts with the clamp jaw 104 further forcing the clamp jaw 104 toward the flange 26.

T-Latch

Figure 12:
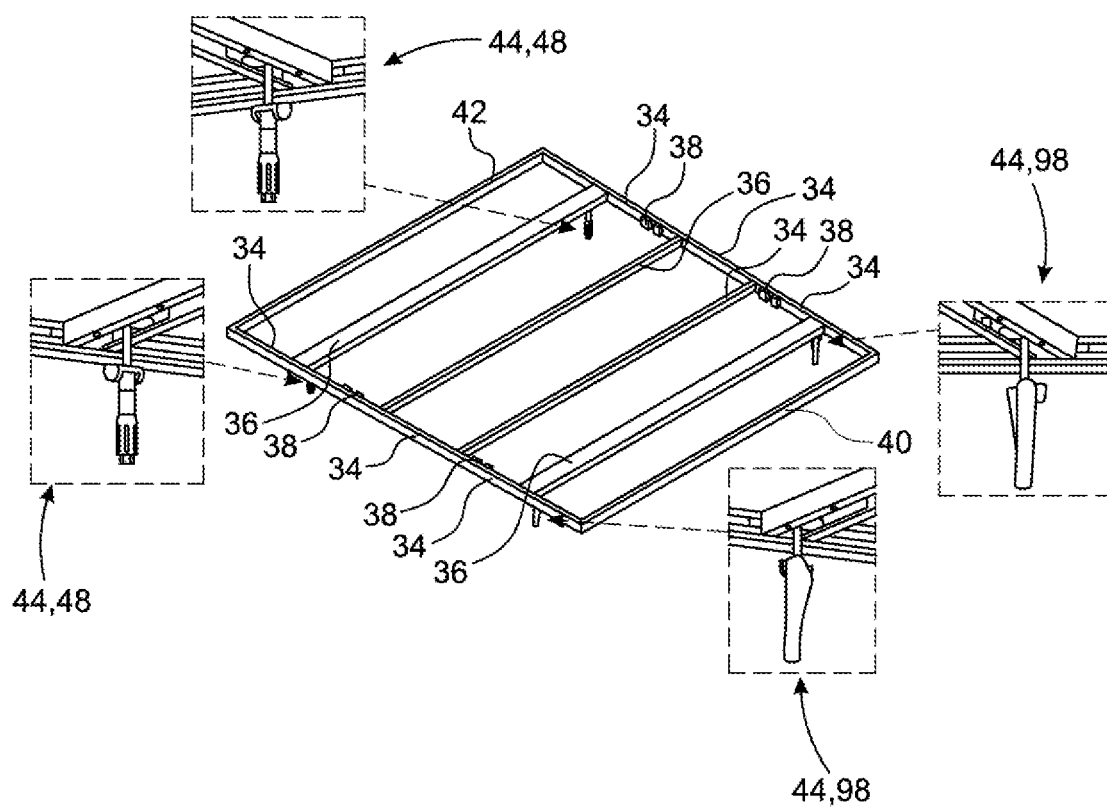
FIG. 12 is a perspective view of framework and another embodiment of latch assemblies for the tonneau cover.

Referring now to FIG. 12, a representative framework 32, like that seen in FIG. 2, for a tonneau cover 10, of the varieties represented by FIG. 1, is illustrated therein. Similarly, the framework 32 includes side frame members 34 separated by hinges 38, lateral frame members 36, a tailgate end lateral member 40, and a bulkhead end lateral member 42. In the interest of conciseness, for a more complete discussion of the tonneau cover 10 and framework 32, attention is directed to the discussion presented in connection with FIGS. 1 and 2. Also, like that seen in connection with the previously discussed embodiment, the framework 32 includes four latch assemblies 44 generally located toward the four corners of the tonneau cover 10.

The latch assemblies 44 also include rotary latch handle assemblies 48 and cam latch handle assemblies 98. The distinction in the present embodiment from the prior embodiments lies in the engagement of the adjustment rod with the pivot barrel, the engagement of the pivot barrel with the latch base and the construction of the latch base itself. Accordingly, for discussions regarding the handle assemblies 48, 98, reference is made to the previously discussion of these features.

Figure 13:
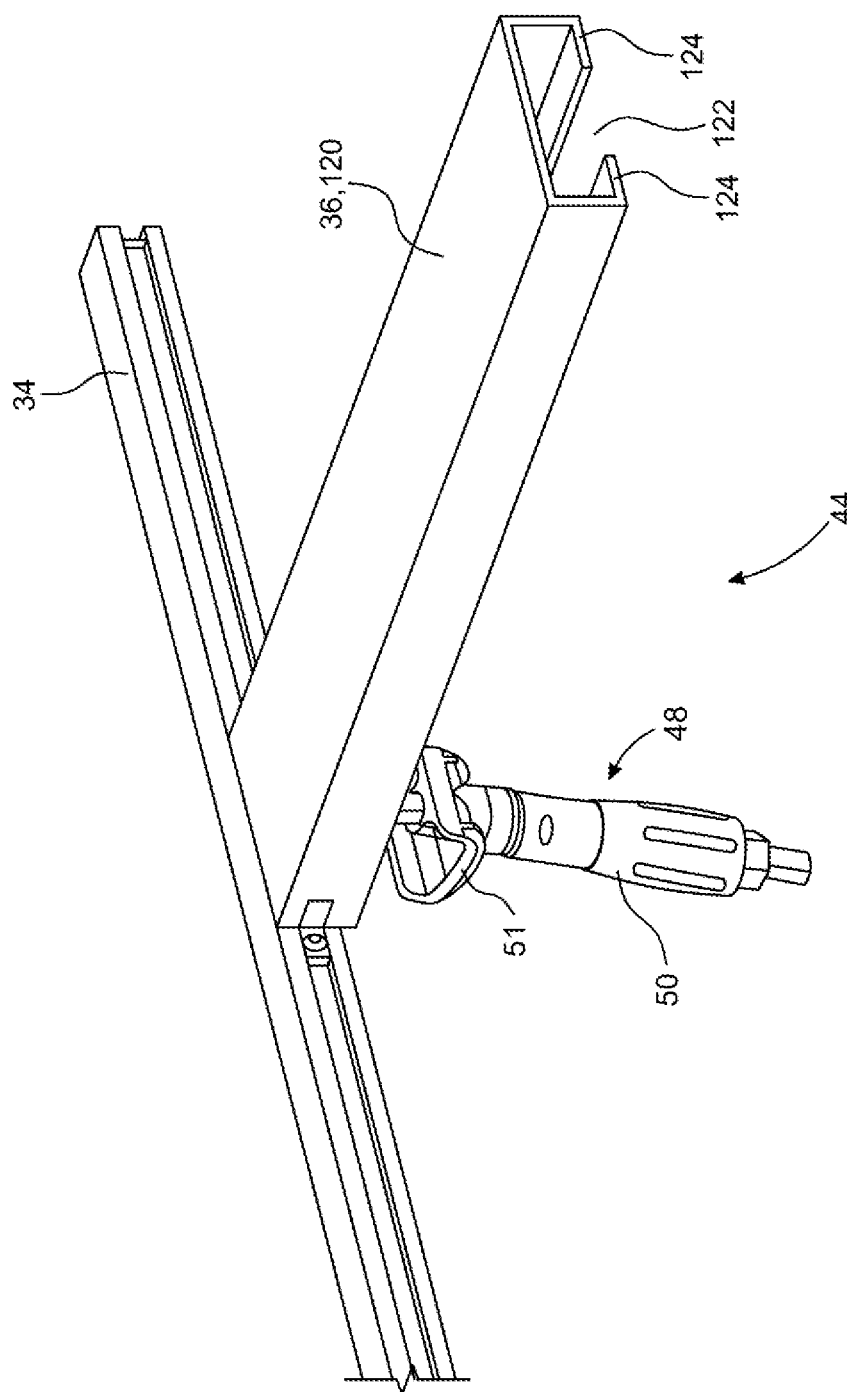
FIG. 13 is a perspective view of the latch assembly of FIG. 12 in connection with the framework of the tonneau cover.
Figure 14:
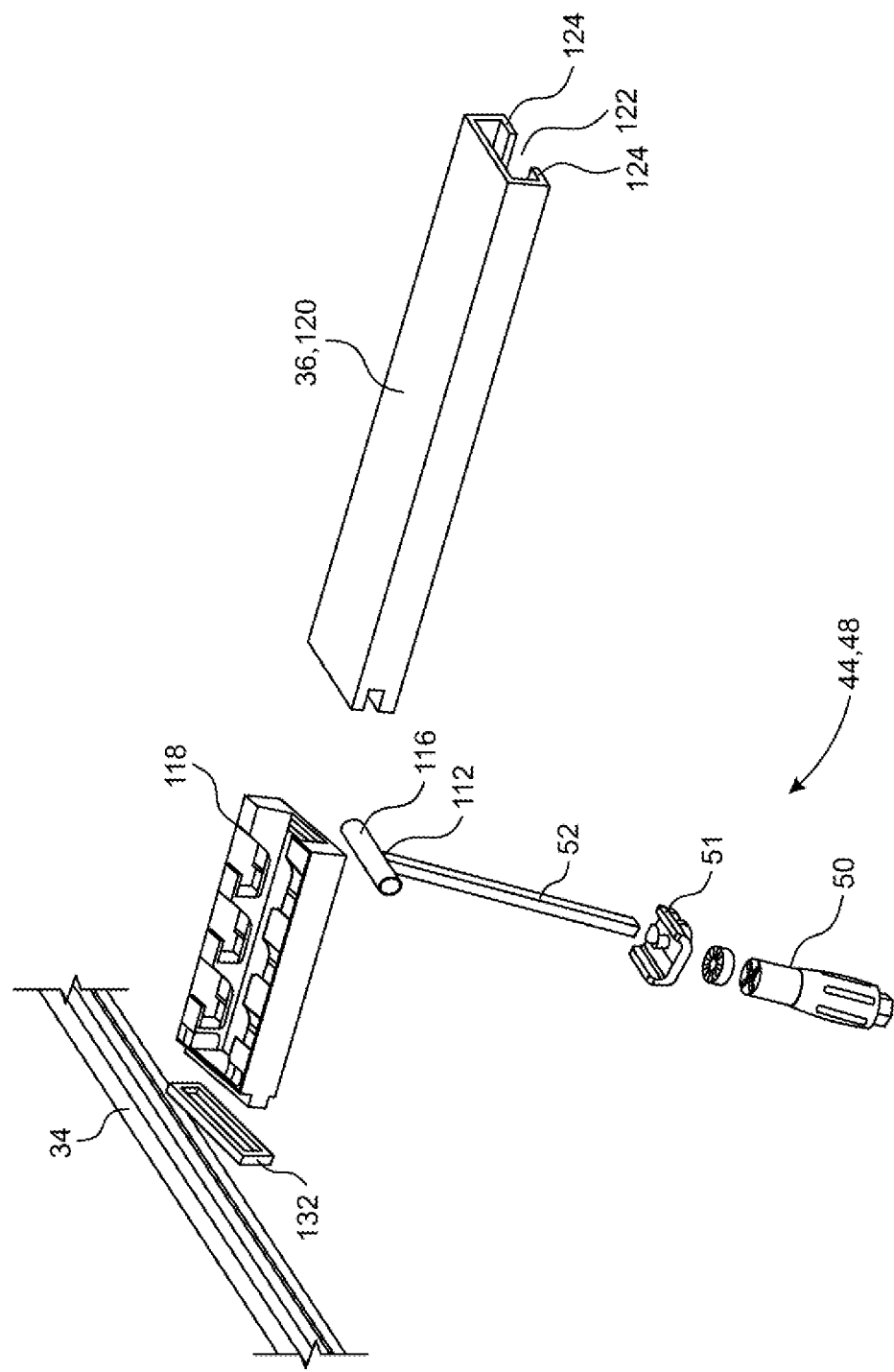
FIG. 14 is an exploded view of the latch assembly seen in FIG. 13.
Figure 15:
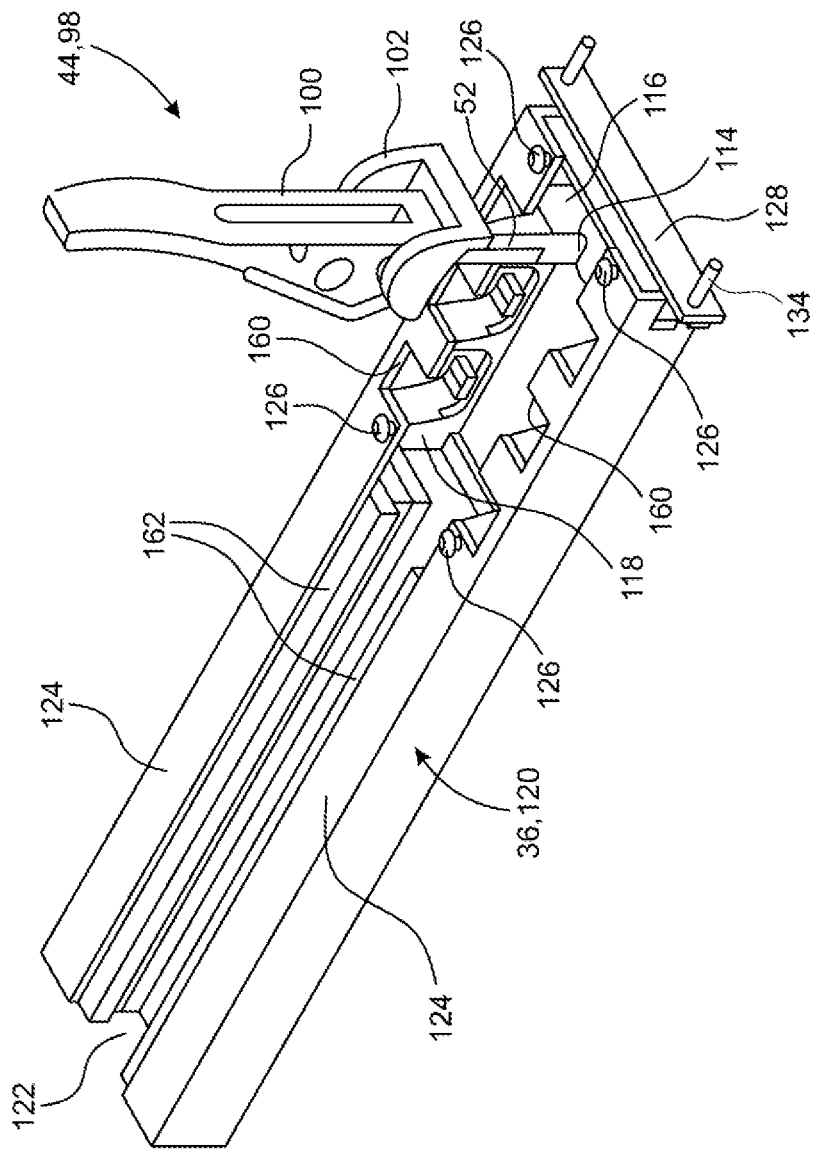
FIG. 15 is an inverted view of the latch assembly seen in FIG. 13, apart from the framework.

As seen in FIGS. 13-15, the latch handle assemblies 48, 98 include an adjustment rod 52 having tip 112 that is fixedly received within a bore 114 of a pivot barrel 116. In one preferred embodiment, the tip 112 is be threadably engaged in the bore 114 of the pivot barrel 116 forming a T-bar construction. In an alternative embodiment, the tip 112 is threadably secured by a nut. The latch assemblies 44 also include a latch base 118 engaged with the pivot barrel 116 of the latch handle assemblies 48, 98.

The latch base 118 is received within the end of an aluminum extrusion 120, which may be the end of a lateral frame member 36 in a soft folding tonneau cover 10 or a separate extrusion incorporated into an opening formed in a corresponding tonneau section 28', 28" of a hard folding tonneau cover 10. The extrusion 120 may be formed as a channel member having central slot 122 bounded by inwardly extending flanges 124 on a lower side of the extrusion 120 (in the installed position).

The latch base 118 is received in the end of the extrusion 120 and is retained therein by mechanical fasteners 126, such as screws or rivets, extending through the flanges 124 into the body of the latch base 118. The latch base 118 also includes a flange 128 on one end, positioned outward of the extrusion 120, and used to secure the latch base and extrusion 120 to the corresponding side frame member 34. The flange 128 may be received in a slot 130 formed in the side frame member 34 or may be secured to an insert 132 provided in the slot 130 by threaded fasteners 134 that clamp the flange 128 to the side frame member 34 via the insert 132.

Figure 18:
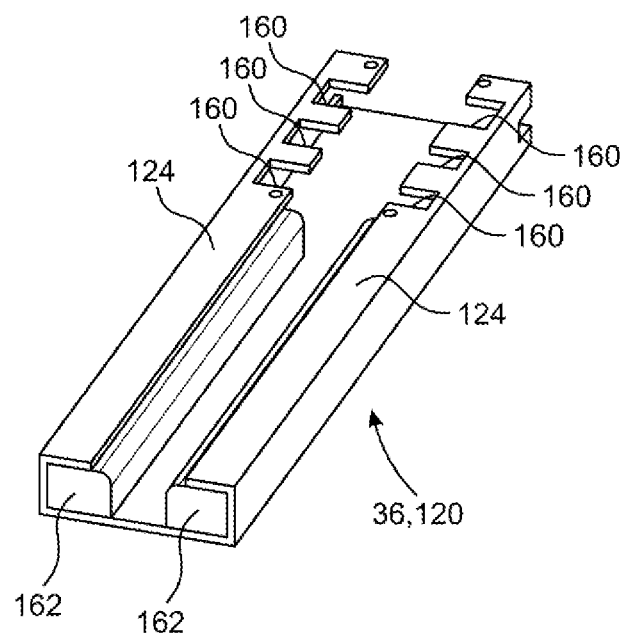
FIG. 18 is an inverted perspective view of a portion of a lateral frame member used in conjunction with the latch assembly of FIG. 12.
Figure 19:
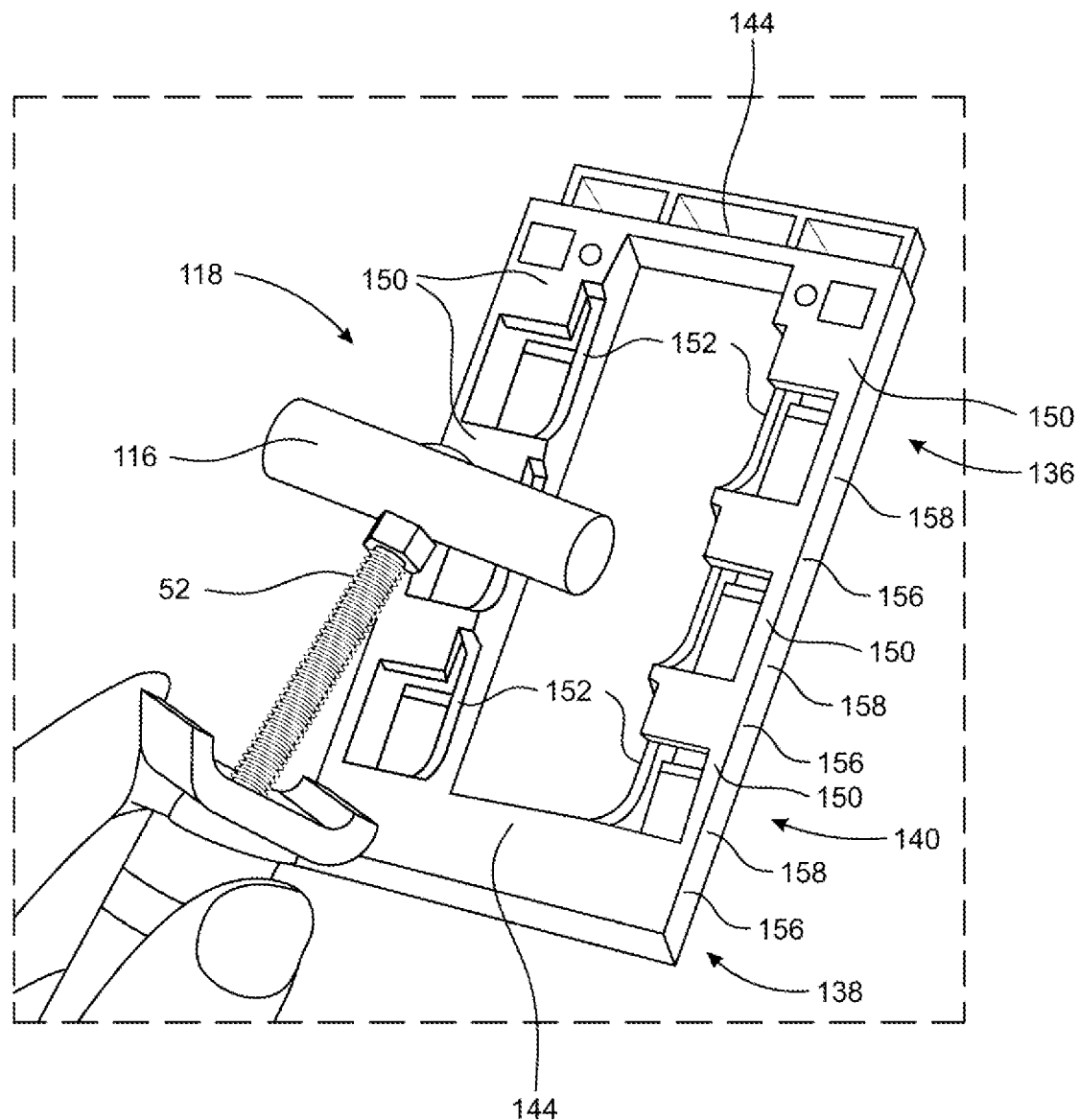
FIGS. 19, 20A and 20B illustrate the latch handle assembly and engagement with a mounting position defined by latch base, shown inverted for clarity purposes.
Figure 20A:
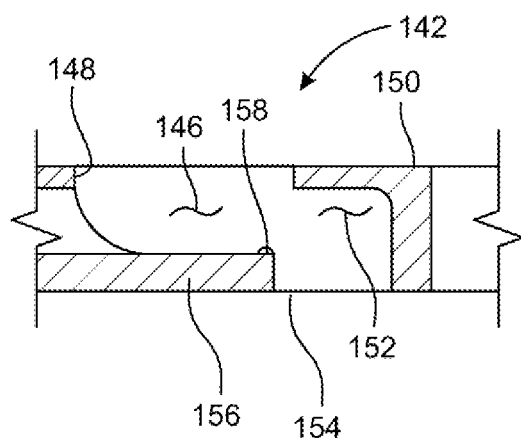
Figure 20B:
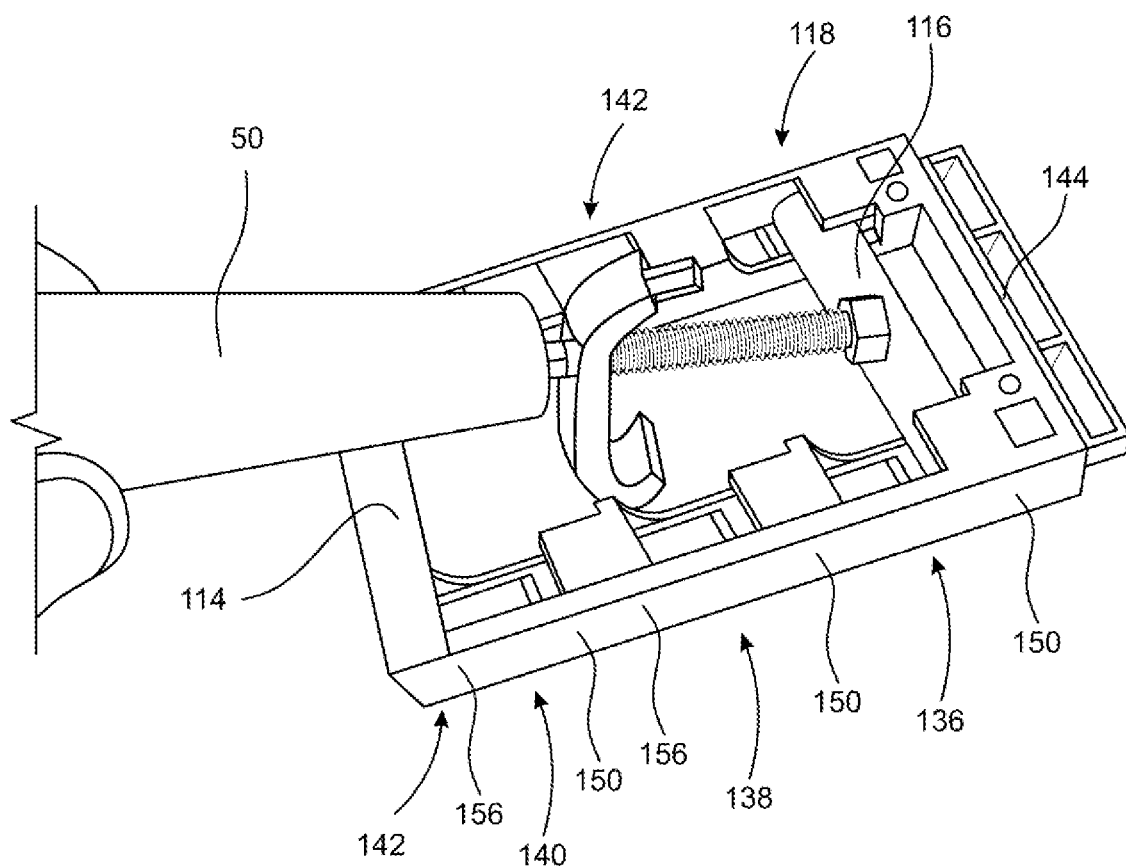

Referring now to FIGS. 18 and 19, the latch base 118 defines multiple positions, three in the figures, for mounting of the latch handle assemblies 48, 98 to the latch base. These mounting positions are used to enable the tonneau cover 10 to be used with various sized bed rails 24 of different trucks 14. Similar to the prior embodiment, the three positions include a narrow or first mounting position 136, a wide or third mounting position 140, and an intermediate mounting position 138 located between the narrow and wide mounting positions 136, 140.

Figure 21:
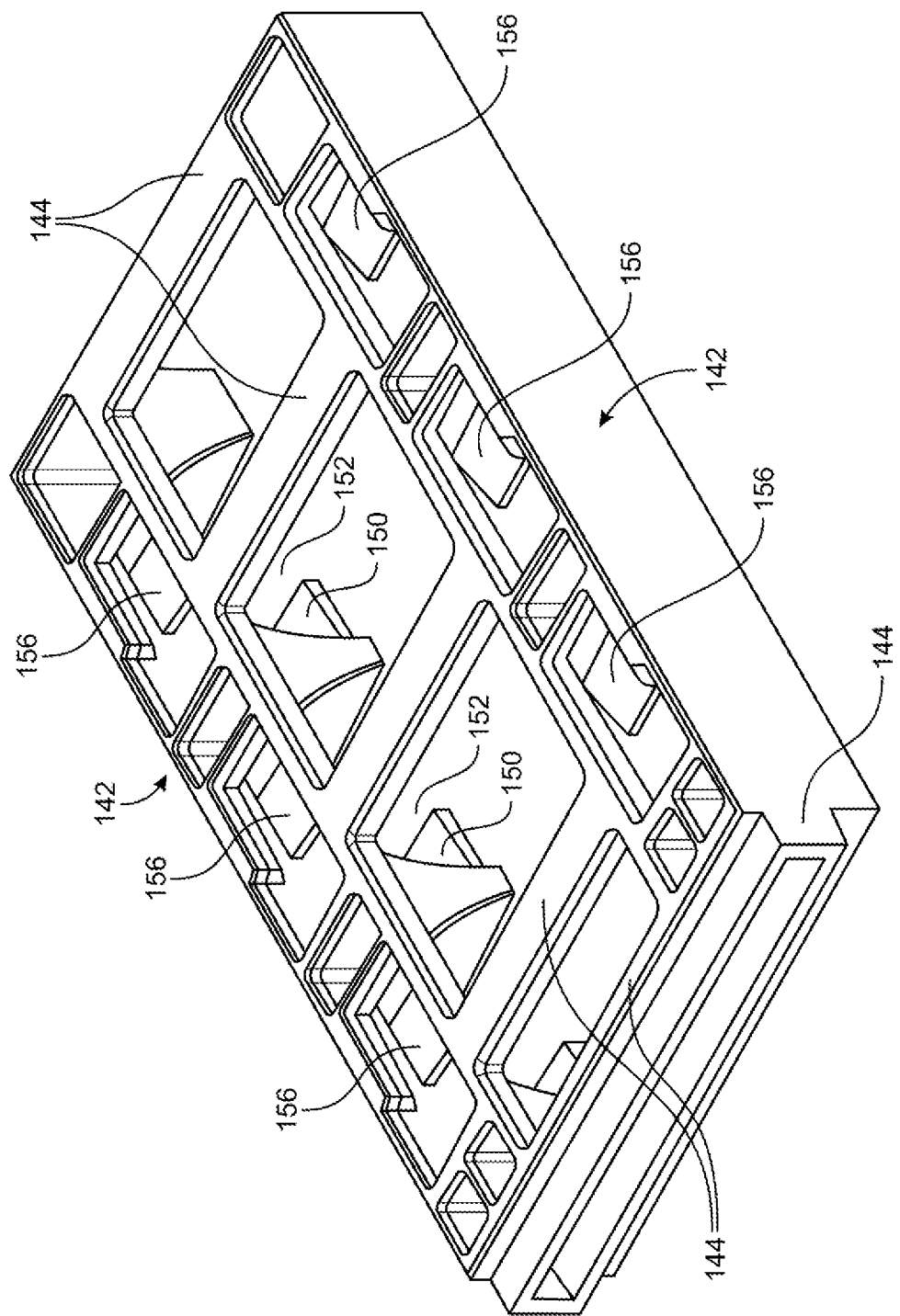
FIG. 21 is top perspective view of the latch base.

Each mounting position 136, 138, 140 is cooperatively defined on opposite sides of the latch base 118 in side rails 142 of the latch base 118. The side rails 142 form part of the body of the latch base 118 and are connected at opposed ends by webs or cross members 144, which may also be provided centrally between the side rails as seen in FIG. 21. The mounting positions 136, 138, 140 are distinct in that the pivot barrel 116 must be removed from the latch base 118 in order to be repositioned in another one of the mounting positions 136, 138, 140. Thus, there is no common pathway or passage for the pivot barrel 116 between the mounting positions 136, 138, 140.

In each side rail 142, the mounting positions 136, 138, 140 are formed by a channel 146 extending from an opening 148 in the bottom wall 150 of the side rail 142. The channel 146 extend obliquely from the opening 148 to a recess 152 defined between the bottom wall 150 and a top wall 154 of the side rail 142. In one embodiment, the webs 144 may positioned so as to effectively operate as the top wall allowing the recess 152 to open immediately above the bottom wall 150. Proceeding toward the recess 152, the channel 146 is partially defined by a resilient tang 156 having a protuberance 158 formed on the free end of the tang 156. Upon insertion of the pivot barrel 116 through the opening 148 into the channel 146 and toward the recess 152, the pivot barrel 116 causes the tang 156 to deflect outwardly allowing the pivot barrel 116 to pass over the protuberance 158 and into the recess 152, at which point the tang 156 returns to its original position and the protuberance 158 operates as a stop inhibiting removal of the pivot barrel 116 from the recess 152 and the mounting positon 136, 138, 140. In the recess 152, the pivot barrel 116, and therefore the latch handle assembly 48, 98, is free to pivot toward and away from the side frame member 34.

To enable the pivot barrel 116 to enter through the openings 148 in the bottom wall of the latch base 118, the flanges 124 of the extrusion 120 are provided with cutouts 160 that correspond with the openings 148. The cutouts 160 are readily seen in FIGS. 15 and 18.

Figure 16:
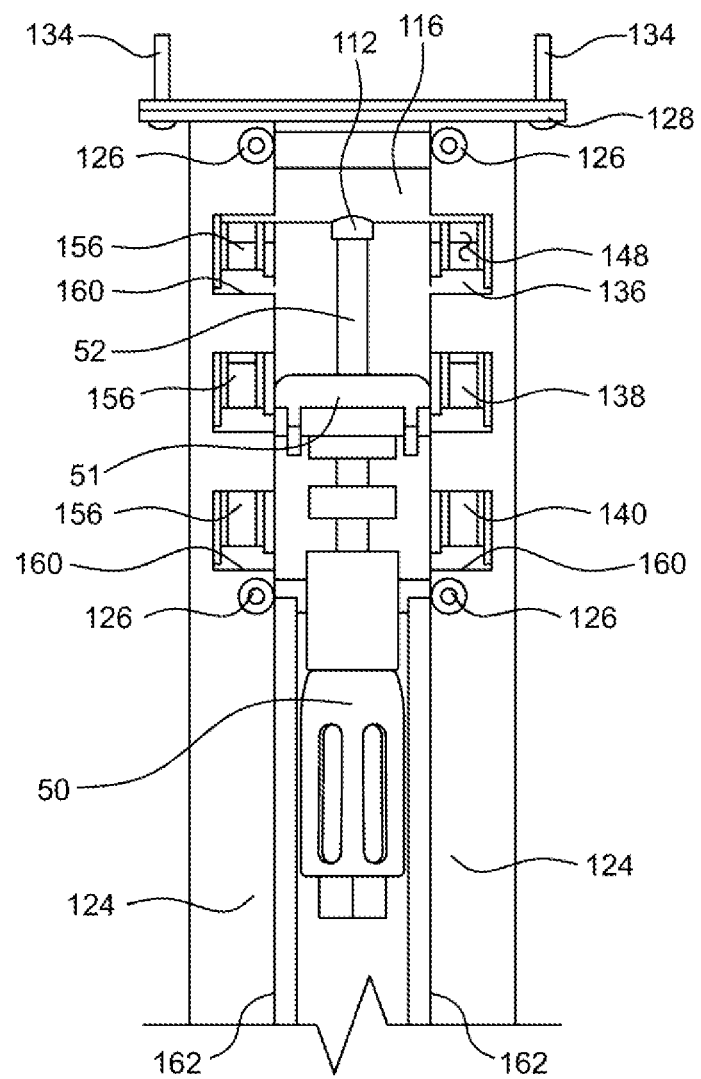
FIGS. 16 and 17 are plan views of the latch assembly seen in FIG. 15 in stored positions.
Figure 17:
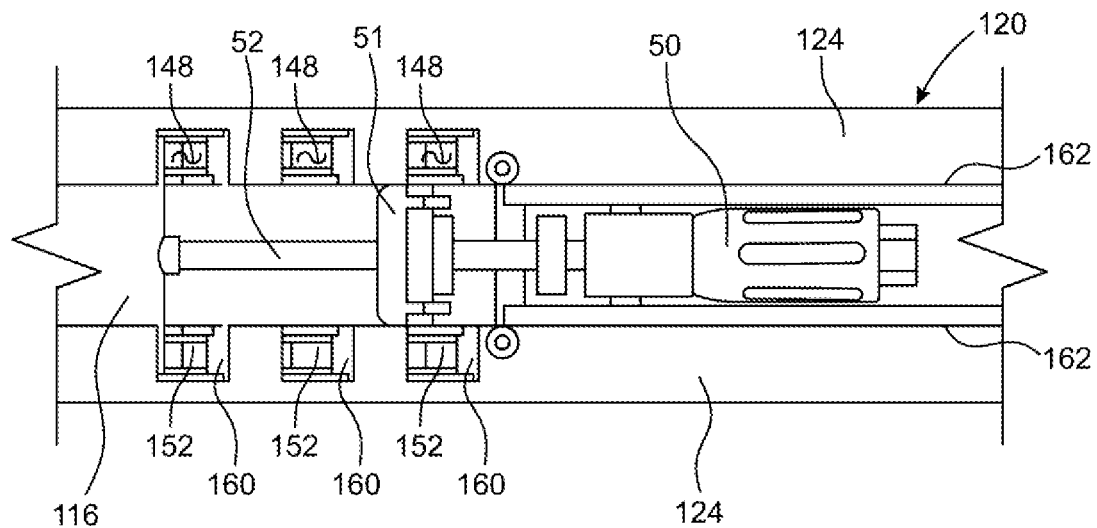

The center portion of the latch base 118, between the side rails 142, is generally free of obstruction allowing the latch handle assemblies 48, 98 to pivot upward into the extrusion 120 from its use position, seen in FIG. 15, into a stowed position, regardless of the mounting position 136, 138, 140 of the pivot barrel 116. The stowed position of the latch handle assemblies 48, 98 is seen in FIGS. 16 and 17.

To retain the latch handle assemblies 48, 98 in the stowed position, resilient retainers 162 extend in the extrusion 120 away from the latch base 118 beneath the flanges 124. The retainers 162 may be formed from a foam material and are preferably sized so as to define a distance there between that is slightly less than the effective width of the screwdriver-like handle 50 and lever handle 100. The retainers 162 therefore squeeze against the respective handle 50, 100 retaining the latch handle assemblies 48, 98 in the stowed position. The retainer may be monolithic as seen in FIG. 18 or formed in a layer construction as seen in FIG. 15.

Conveyor Latch

Referring now to FIGS. 22-26, a third embodiment of a latch assembly for a tonneau cover 10 is illustrated therein. As seen below, a conveyor latch assembly 170 may be incorporated into either of the frameworks 32 discussed above as a substitute for the latch assemblies 44 discussed in connection therewith. The conveyor latch assembly 170 of the present embodiment similarly includes a latch base 172 and a latch handle assembly 174. The latch base 172 may be incorporated into the ends of a lateral frame members 36, which may be and extrusion 120, associated with tonneau sections 28', 28" and which may be provided as part of a soft fold tonneau cover 10 or a hard fold tonneau cover 10. The side frame member 34 and lateral frame member 36 are only diagrammatically depicted in FIGS. 22-24.

Rather than a generally block shaped latch base having defining distinct mounting positions as seen in the prior embodiments, the latch base 172 of the present embodiment is provided in the form of a conveyor having an endless belt 176, of nylon strapping or similar material, extended about end rollers 178 that are rotationally coupled to the side walls of the lateral frame member 36 utilizing bearings, bushings or similar means. Alternatively, the rollers may be fixed and have a low friction outer surface. As such, the belt 176 is free to move about the rollers 178.

Attached to the belt 176 is a latch handle assembly 174, which may be a rotary latch handle assembly 48, a cam lever latch handle assembly 98 or other style of latch handle assembly, such as the dial latch handle assembly 170 discussed below. The latch handle assembly 174 is pivotally coupled to the belt 176 at fixed position of the belt 176 and, therefore, the position of the pivot connection moves with the belt 176 toward or away from the side frame member 34 (arrows 177) and the associated flange 26 of the bed rail 24 of the truck 14. The pivotal connection of the latch handle assembly 174 may be made by various means, including providing eyelet 180 on the end of an adjustment rod or strap 182 of the latch handle assembly 174 and coupling the eyelet 180 to via an integral loop 184 formed with the belt 176 and extended through the eyelet 180 to captively retain the eyelet 180.

The latch handle assembly 174 may be adjusted so as to lengthen or shorten, as indicated by arrows 186, the position of a hook or clamp jaw 188 relative to side frame member 34. The hook 188 is integrally formed on the distal end of a handle body 190 into which the adjustment strap 182 is received. The handle body 190 further includes a rotary dial 192, threadably coupled to the handle body 190 and adjustment strap 182, so that rotation (arrow 194) of the dial will operate to tighten and or loosen fixation of the adjustment strap 182 with the handle body 190 and allow adjustment of the hook 188 via relative movement of the adjustment strap 182 in the handle body 190. As such, with the hook 188 engaged with the flange 26 of the bed rail 24, once the appropriate tension in the latch handle assembly 174 has been set via the adjustment strap 182, the latch assembly 170 is able to self-center into a best leverage position because the belt 176 is free to move about the roller 178. Once self-centered, the tension of the adjustment strap 182 may again be adjusted, if necessary, to retain the tonneau cover 10 to the bed of the truck 14.

Figure 22:
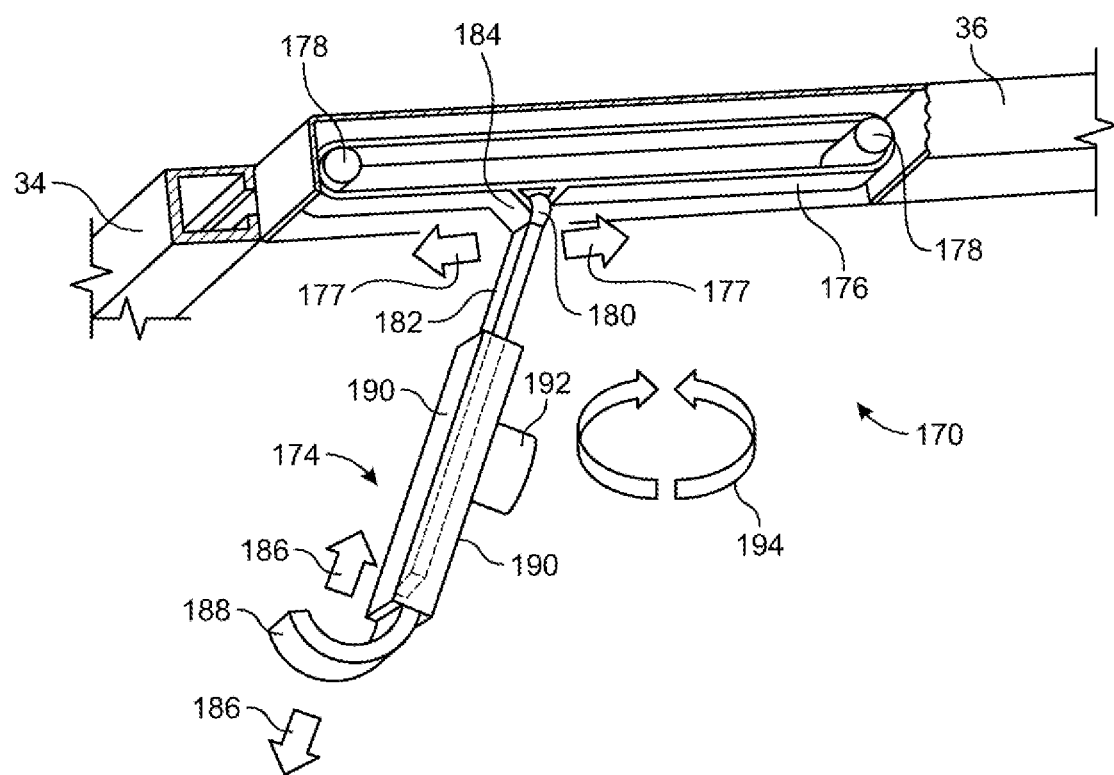
FIG. 22 is schematic illustration of another embodiment of a latch assembly for the tonneau cover.
Figure 23:
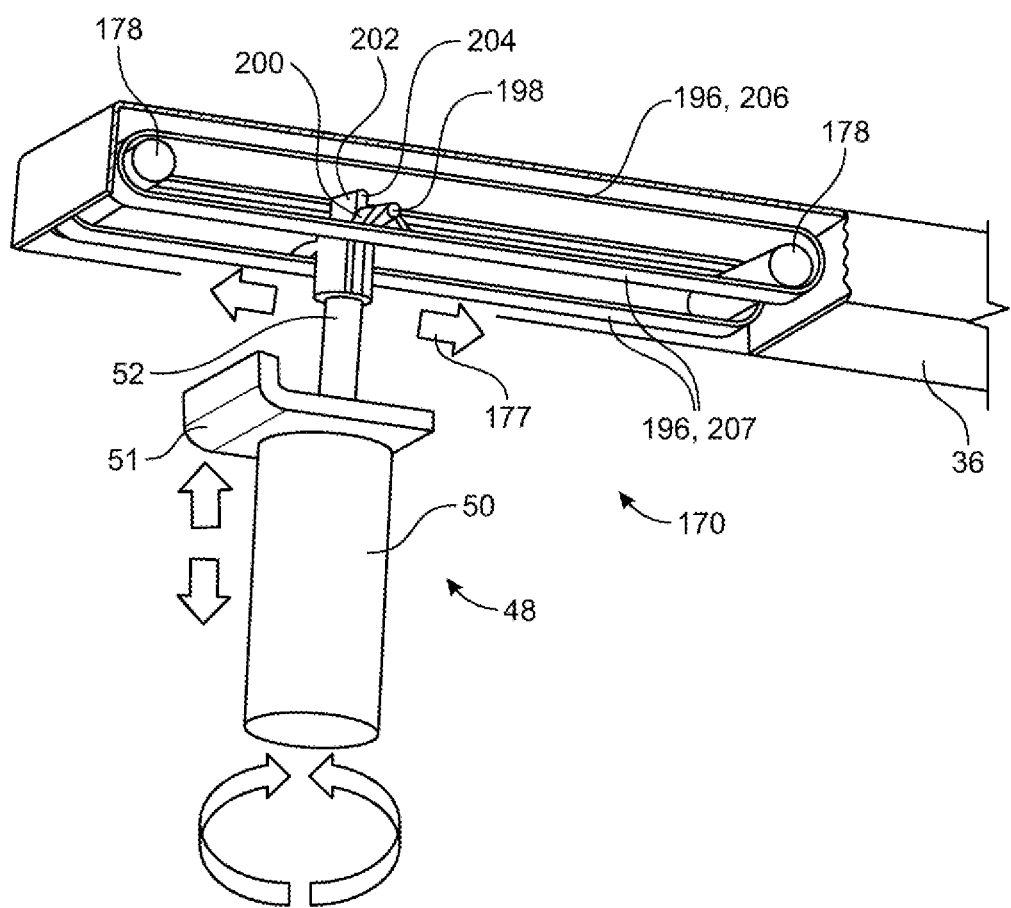
FIG. 23 is a schematic illustration of a variation of the latch assembly seen in FIG. 22.

FIG. 23 illustrates variations on the conveyor latch assembly 170 seen in FIG. 22. In one variation, the dial latch handle assembly 174 may be replaced with the rotary latch handle assembly 48 discussed above and utilized with the belt 176 of FIG. 22. Alternatively, a variation of the belt 176 may also be used. As seen in FIG. 23, the belt 176 is replaced with a belt 196 having a split construction, which may be full or partial (designated in phantom). With the split in the belt 196, a pivot shaft or barrel 198, coupled to the end of the adjustment rod 52, may be located within the endless loop defined by the belt 196 and retained to the belt 196 by an inner integral loop 200 of the belt 198, similar to the loop 184 of the previously variation seen in FIG. 22.

Figure 24:
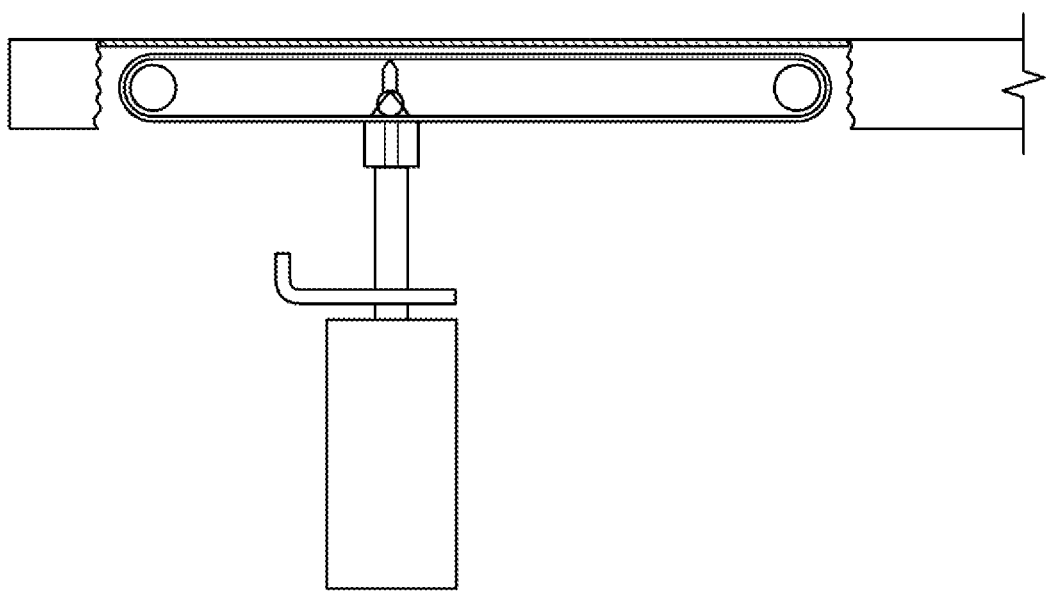
FIG. 24 is a side view of the latch assembly seen in FIG. 23.
Figure 25:
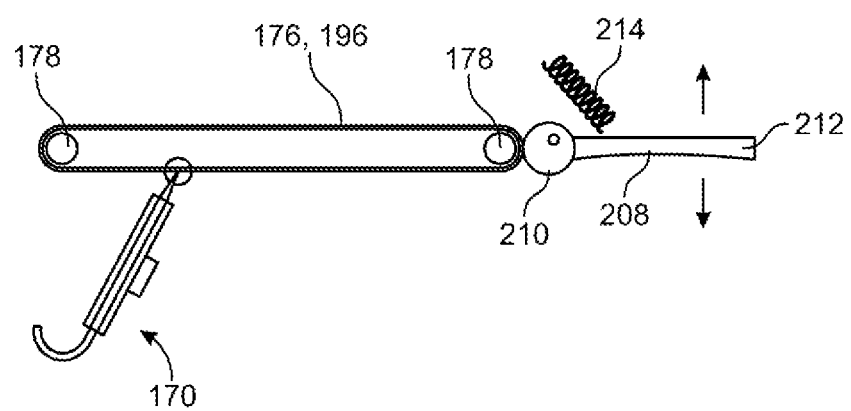
FIG. 25 is a diagrammatic view of a mechanism for locking the latch assemblies of FIGS. 22 and 23.
Figure 26:
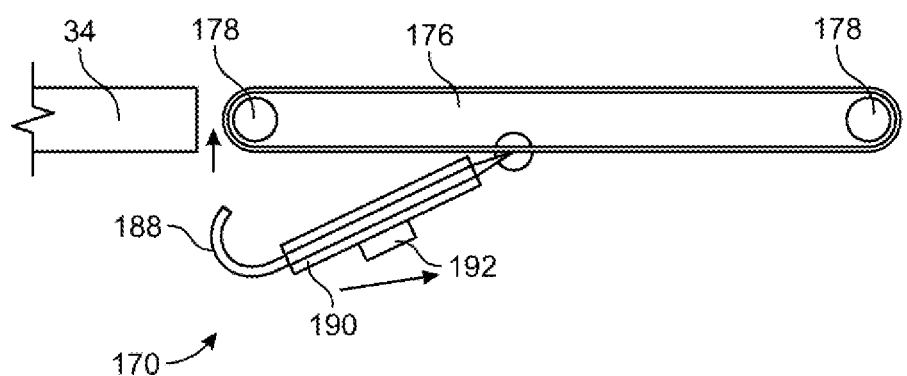
FIG. 26 is a diagrammatic view of mechanism for storing the latch assemblies of FIGS. 22 and 23.

As further seen in FIG. 24, an extension 202 may be provided off of the pivot shaft 198, toward the upper run 204 of the belt 196. The extension 202 is dimensioned so that when the latch assembly 170 is in its use position and engaged with the flange 26 of the bed rail 24, an end 204 of the extension 202 will engage the upper run 206 of the belt 196 and fix the position of the belt 196. In other words, the engagement of the extension 202 with the upper run operates to lock the belt 196 and prevent further movement about the rollers 178.

Other means for locking the position of the latch assembly 170 may also be provided. As seen in diagrammatically presented in FIG. 25, a cam lock 208 may be provided at one end of the belt 176, 196 so as to engage a cam surface 210 with the belt 176, 196 and to pinch the belt 176, 196 between the cam surface 210 and the roller 178. The cam lock 208 may include a lever arm 212 coupled to the cam surface 210 and biased by a spring 214 to lock movement of the belt 176, 196. By depressing the lever arm 212 against the bias of the spring 214, the cam surface 210 is rotated out of engagement with the belt 175, 196 and the belt 176, 196 freed for movement.

In order to store the latch assembly 170 to allow for folding of the tonneau cover 10, in the variation of FIG. 22, the latch handle assembly 174 may be rotated to position the hook 188 about the return end of the belt 176 and roller 178 adjacent to the side frame member 34. The handle body 190 may be then adjusted along the adjustment strap 182 and the dial 192 tightened to fix the hook 188 about the roller 178 and secure the latch assembly 170 in a stowed position allowing folding of the tonneau cover 10. In the variation of FIG. 23, the belt 196 may be moved such that the pivot connection of the latch handle assembly 48 with the belt 196 is near the roller 178 and return end of the belt 196 adjacent to the side frame member 34. The screwdriver-like handle 50 and clamp jaw 51 may then be rotated into a position where they are generally between the upper and lower runs 206, 207 of the belt 196. In this position, the tonneau cover 10 may be folded without interference from the latch assembly 170.

Rail Attachment

Referring now to FIGS. 27-31, a rail attachment for the bed rail 24 of a truck 14 is seen therein and generally designated at 220. The rail attachment 220 provides an anchor point for various accessories that person might desire to incorporate into the bed 12 of their truck 14. Such accessories might include, without limitation, a striker for the latch assembly of a tonneau cover, such as the tonneau cover 10 seen in FIG. 1, a cargo or tailgate net, a tool pouch, a grocery bag hook, a tie down loop, etc.

Figure 27:
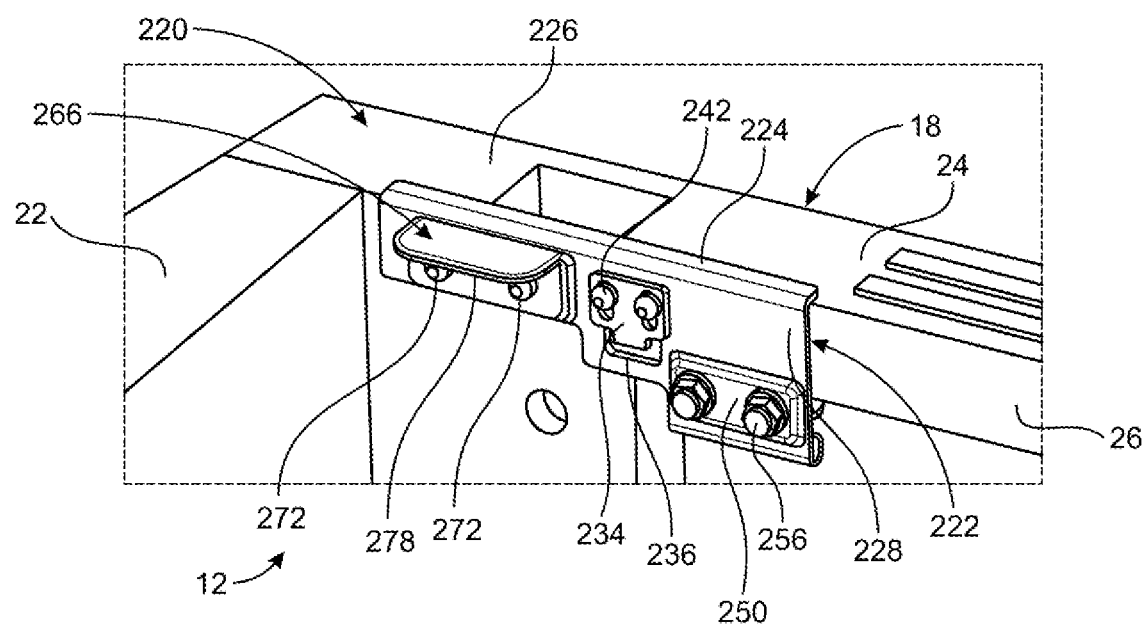
FIG. 27 is a perspective illustration of a bed rail attachment for a pickup truck.
Figure 28:
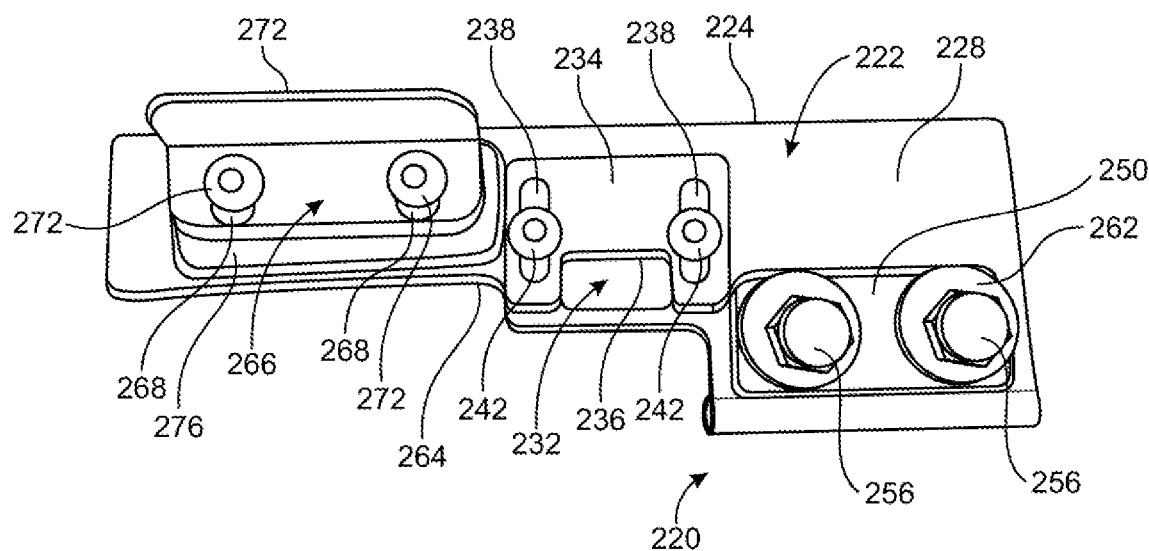
FIG. 28 is a side view of the bed rail attachment seen in FIG. 27.
Figure 29:
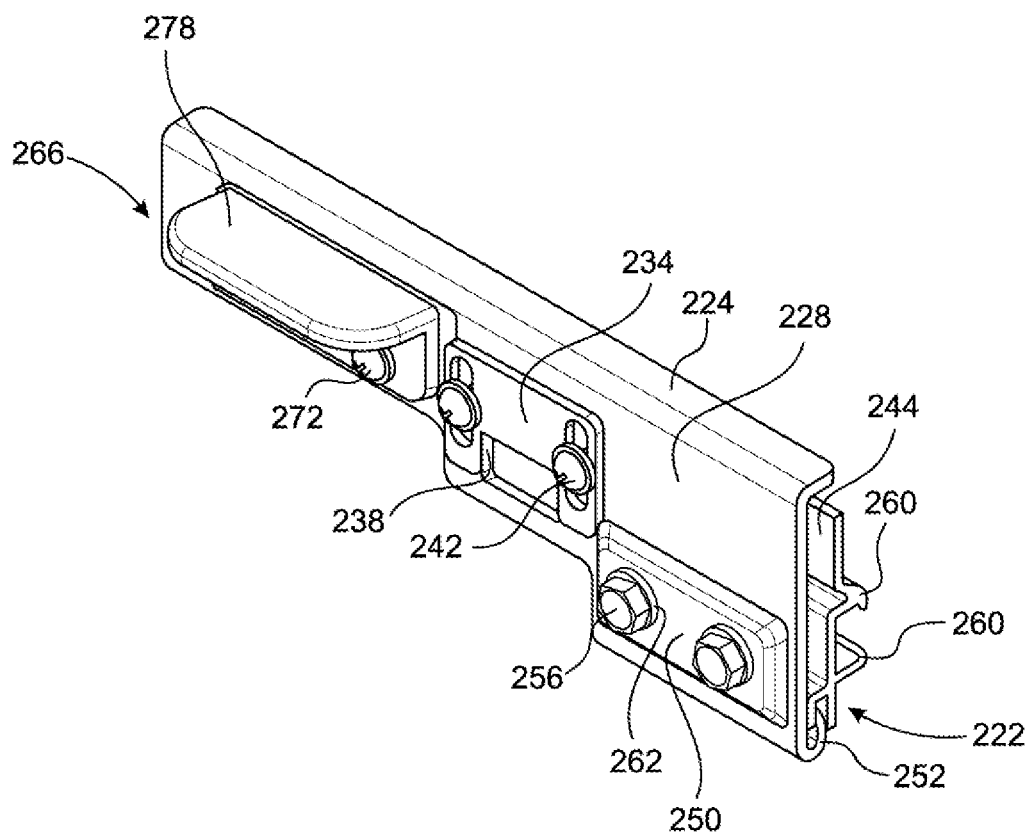
FIG. 29 is an exploded view of the bed rail attachment.

As seen in FIG. 27, the rail attachment 220 mounts to the bed rail 24 of one of the sidewalls 18 of the truck's bed 12, generally as close as practical to the tailgate 22. The rail attachment 220 is configured to clamp both vertically and laterally to the flange 26 of the bed rail 24. In this regard, the rail attachment 220 includes a base plate 222 having a upper lip 224 extending outward from a base wall 228 and configured to engage the upper surface 226 of the bed rail 24. The side of the base wall 228 in contact with the flange 26 may be provide with a backing 230 (e.g. foam or double sided tape) to inhibit damage or scratching of the bed rail 24 by the attachment rail 220.

A vertical clamp opening 232 is provided in the wall 228 of the base plate 222 and a catch plate 234 is received over the opening 232. The catch plate 234 includes a flange forming a catch 236 that is oriented perpendicular to the flange 26 of the bed rail 24 and extends through the clamp opening 232. The catch plate 234 is also provided with two adjustment slots 238, extending vertically and parallel to the plane of the flange 26 of the bed rail 24. The position of the slots 238 align with threaded bores 240 provided in the base plate 222 on opposite sides of the clamp opening 232.

To mount the rail attachment 220 to the bed rail 24, the upper lip 224 is rested on the upper surface of the bed rail 24 with the backing 230 and the wall 228 pushed firmly against the flange 26. In this position, the lower edge of the flange 26 registers somewhere within the clamp opening 232. The catch plate 234 is position over the clamp opening 232 with the catch 236 beneath the lower edge of the flange 26, and threaded fasteners 242 are inserted through the slots 238 and into the bores 240. Next, the catch plate 234 is raised to clamp the flange 26 between the catch 236 and the upper lip 224 and the fasteners 242 tightened to secure the rail attachment 220 down onto the bed rail 24.

To secure the rail attachment 220 laterally to the flange 26 of the bed rail 24, a clamp plate 244 is positioned behind and overlapping the lower edge of the flange. 26. The clamp plate 244 includes bores 246 that align with clamp slots 248 provided in a reinforced portion or embossment 250 of the base plate 222. The embossment 250 is preferably located forward of and lower than the clamp opening 232 so as to be clear of the lower edge of the flange 26 of the bed rail 24. Beneath the embossment 250, the base plate 222 includes a returnly bent lower end forming a upturned lip 252 to receive and hold the clamp plate 244 during positioning of the rail attachment 220. The clamp plate 244 may be provided with correspondingly shaped downturned lip 254 to engage and support the clamp plate 244 on the base plate 222. With the flange 26 located between the clamp plate 244 and the base plate 222, threaded fasteners (e.g bolts) 256 are inserted through the clamp slots 248 and bores 246 and engaged by nuts 258 on the opposing side of the clamp plate 244. The clamp plate 244 may be additionally formed with flanges 260 defining a slot to receive the nuts 258 and prevent their rotation to aid in engagement with the fasteners 256. Washers 262 may be provided between the fasteners 256 and the base plate 222. Tightening of the fasteners 256 accordingly will securely clamp the rail attachment 220 laterally with the flange 26 of the bed rail 24.

Rearward of the clamp opening 232, toward the tailgate 22, the rail attachment 220 is provided with a second embossment 264. The second embossment 264 defines an attachment point for a bolt-on anchor point 266 that may be used to secure a tonneau cover 10 to the bed 12 through use of slam latches. The anchor point 268 includes vertical slots 268 that aligned with bores 270 defined in the embossment 264 so as to be secured with threaded fasteners 272 inserted there through and engaged by Pem nuts 274. A tapered shim 276 may be provided between the anchor point 266 and the embossment 264. The shim 276 allows for a catch 278 extending laterally into the bed 12 from the anchor point to be horizontally aligned, while the slots 268 allow for the vertical positioning of the catch 278. These positions may be adjusted so that the slam latch of the tonneau cover 10 is properly engaged with the anchor point and the tonneau cover 10 secured.

Figure 30A:
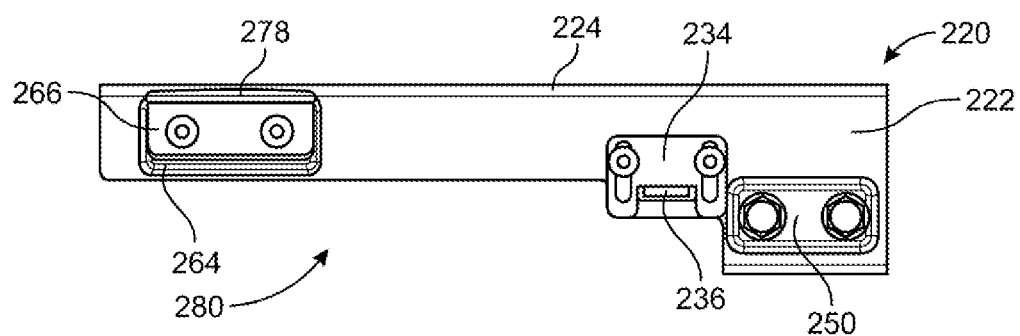
FIGS. 30A and 30B are side view of long and short sizes of the bed rail attachment.
Figure 30B:
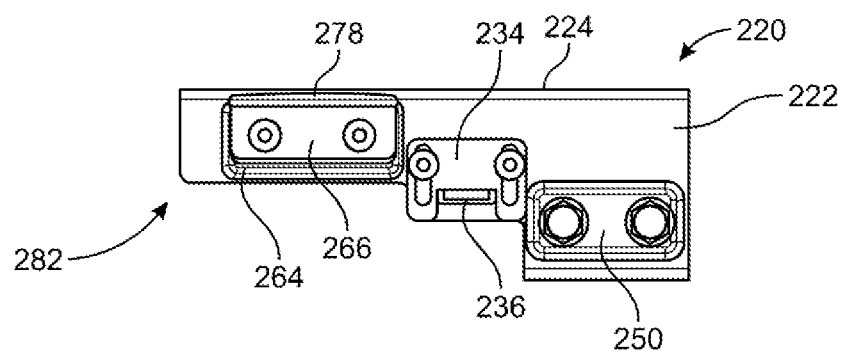

As seen in FIGS. 30A and 30B, the base plate 222 may be provided with different lengths, long and short versions 280, 282, for use with different trucks 14. In each instance, the anchor point 266 is located as close as practically possible to the end of the base plate 222 adjacent to the tailgate 22.

Figure 31:
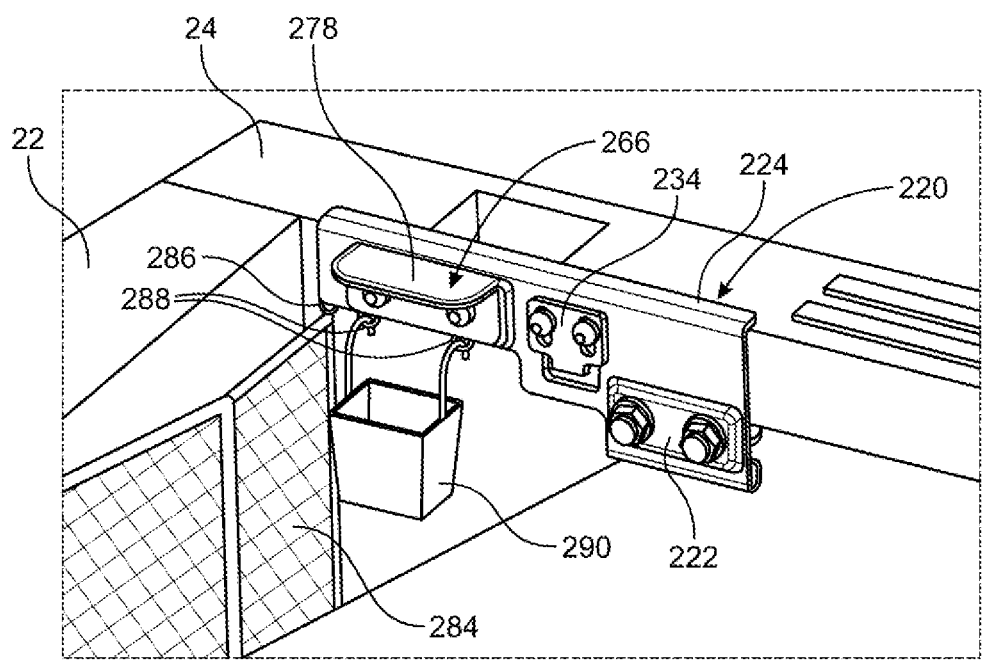
FIG. 31 shows the bed rail attachment in conjunction with different accessories that are illustrative of the types of accessories that can be used therewith.

As previously noted, rail attachment 220 can be configured to receive and work with various accessories that might be desirable. The rail attachment 220 may be provided with additional hooks, loops or apertures to which the accessories can be secured. As seen in FIG. 31 a tailgate net 284 is attached to a hook 286 extending from a lower edge of the rail attachment. Additional loops 288 may be provided off of the same edge, or elsewhere for engagement by a pouch 290, such as a tool pouch.

Although the invention has been described with reference to certain specific embodiments incorporating the principles of the invention. One skilled in the art will readily appreciate that the invention is susceptible to modification, variation and change without departing from the true spirit and fair scope of the invention, as defined in the claims that follow.

The scope of the claims should therefore not be limited by the preferred embodiments, but should be given the broadest interpretation consistent with the description as a whole. The terminology used herein is therefore intended to be understood in the nature of words of description and not words of limitation.

We claim:

1. A tonneau system for use with a bed of a pickup truck, the bed having opposing first and second sidewalls and also having a front sidewall extending between the first and second sidewalls at one end thereof and a rear sidewall extending between the first and second sidewalls at another end thereof, the tonneau system comprising:
   a tonneau cover having at least two tonneau sections including a first tonneau section and a second tonneau section, the tonneau sections being moveable relative to one another between an unfolded state and a folded state, in the unfolded state the tonneau sections substantially covering the cargo box, in the folded state the tonneau sections being arranged in a stack with the tonneau sections arranged one atop another; and
   a plurality of latch assemblies, each latch assembly including a latch base and a latch handle assembly, the latch handle assembly further including a handle, a clamp jaw, an adjustment member, the handle and clamp jaw supported on the adjustment member with the handle being engaged with the clamp jaw and configured to move the clamp jaw relative to the adjustment member, the adjustment member being connected at one end to the latch base; and
   the latch base including a belt extending about end rollers and being moveable about the end rollers in a direction generally transvers to lateral side of the tonneau cover.

2. The tonneau system according to claim 1, wherein the belt is an endless belt.

3. The tonneau system according to claim 1, wherein the adjustment member is connected to the latch base by attachment of the one end to the belt.

4. The tonneau system according to claim 1, wherein the adjustment member is connected to the latch base by attachment of the one end to the belt at an outer surface of the belt.

5. The tonneau system according to claim 1, wherein the belt includes a central split over at least a portion of the length of the belt.

6. The tonneau system according to claim 5, wherein the adjustment member is connected to the latch base by attachment of the one end to the belt at an inner surface of the belt.

7. The tonneau system according to claim 5, wherein the one end of the attachment member extends through the central split of the belt.

8. The tonneau system according to claim 5, further comprising an extension projecting of off an end of the adjustment member, the projection engaging the belt in a use position of the latch assembly and during such engagement.

9. The tonneau system according to claim 8, wherein the projection engages an upper run of the belt.

10. The tonneau system according to claim 5, wherein the wherein the latch assembly is moveable between use and stowed positions, in the stowed position the clamp jaw of the being located in the split of the belt.

11. The tonneau system according to claim 1, wherein the wherein the latch assembly is moveable between use and stowed positions, in the stowed position the clamp jaw extending about the belt and one end roller of the latch base.

12. The tonneau system according to claim 1, wherein the adjustment member is connected to the latch base by attachment of the one end to the belt at an inner surface of the belt.

13. The tonneau system according to claim 1, wherein the belt is freely moveable about the rollers and tension on the belt during engagement of the latch assembly with the sidewall of the bed cause self-centering of the latch handle assembly and latch base relative to the sidewall of the bed of the truck.

14. The tonneau system according to claim 1, wherein the tonneau cover is a soft fold tonneau cover.

15. The tonneau system according to claim 1, wherein the tonneau cover is a hard fold tonneau cover.

16. The tonneau system according to claim 1, further comprising a lock assembly moveable between a position engaged with the belt and a position disengaged with the belt, in the engaged position the lock assembly inhibiting rotation of the belt.

17. The tonneau system according to claim 16, wherein the lock assembly is a cam lock, the cam lock have a cam surface moveable between the engaged position and the disengaged position.

18. The tonneau system according to claim 17, wherein the cam lock includes a lever handle coupled to the cam surface and configured to move the cam surface between the engage and disengaged position.

19. The tonneau system according to claim 17, wherein the cam lock further includes a biasing member coupled to the cam surface and biasing the cam surface into the engaged position.

* * * * *